(12) United States Patent
Mocko et al.

(10) Patent No.: US 10,268,999 B2
(45) Date of Patent: Apr. 23, 2019

(54) DETERMINING LANGUAGES FOR A MULTILINGUAL INTERFACE

(71) Applicant: Square, Inc., San Francisco, CA (US)

(72) Inventors: Christopher Lang Mocko, San Francisco, CA (US); Koun Han, San Francisco, CA (US); Hsuan-Yu (Jerry) Lin, San Francisco, CA (US); Michael Wells White, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 414 days.

(21) Appl. No.: 15/011,806

(22) Filed: Feb. 1, 2016

(65) Prior Publication Data

US 2018/0150815 A1 May 31, 2018

Related U.S. Application Data

(62) Division of application No. 14/301,603, filed on Jun. 11, 2014, now Pat. No. 9,324,065.

(51) Int. Cl.
*G06Q 30/00* (2012.01)
*G06Q 20/20* (2012.01)
(Continued)

(52) U.S. Cl.
CPC .......... *G06Q 20/202* (2013.01); *G06F 9/454* (2018.02); *G06F 17/289* (2013.01); *G06Q 20/20* (2013.01); *G06Q 20/209* (2013.01); *G07G 1/01* (2013.01)

(58) Field of Classification Search
CPC .......... G06Q 30/06; G06Q 30/02; G06F 3/00; G06F 17/20
(Continued)

(56) References Cited

U.S. PATENT DOCUMENTS 6,062,477 A 5/2000 Wike, Jr. et al.
6,507,352 B1 1/2003 Cohen et al.
(Continued)

FOREIGN PATENT DOCUMENTS

AU 2017202569 A1 5/2017
JP H10-011660 A 1/1998
(Continued)

OTHER PUBLICATIONS

Evans, S.D., "[Python] rotate() in Tkinter—Grokbase," grokbase. com, dated Dec. 6, 2000, Retrieved from Internet URL: http://grokbase.com/t/python/python-list/00c6q9dgz1/rotate-in-tkinter, on Jan. 7, 2015, pp. 1-2.
(Continued)

Primary Examiner — Oluseye Iwarere
(74) Attorney, Agent, or Firm — Lee & Hayes, P.C.

(57) ABSTRACT

In some examples, a merchant device at a point of sale (POS) location may present information to a merchant in a first language preferred by the merchant, and may present information to a buyer in a second language preferred by the buyer. The merchant device may switch between the different languages in response to detecting a change in the physical orientation of a display. For instance, in a first orientation in which the display is viewable from a merchant direction, the merchant device may present information in the language preferred by the merchant. When the orientation of the display is changed to a second orientation in which the display is viewable from a buyer direction, the merchant device may present information in the language indicated to be preferred by the buyer. Various techniques may be used for determining the preferred language of a particular buyer.

20 Claims, 14 Drawing Sheets

(51) Int. Cl.
*G06F 17/28* (2006.01)
*G07G 1/01* (2006.01)
*G06F 9/451* (2018.01)

(58) Field of Classification Search
USPC .......................................... 705/26; 715/700
See application file for complete search history.

(56) References Cited

U.S. PATENT DOCUMENTS

| | | | |
|---|---|---|---|
| 7,464,334 B2 * | 12/2008 | Miller | G06F 9/454 715/700 |
| 7,689,409 B2 * | 3/2010 | Heinecke | G06F 17/2715 382/229 |
| 7,866,546 B1 | 1/2011 | Vance | |
| 8,078,507 B1 * | 12/2011 | Rao | G06Q 30/06 705/26.62 |
| 8,542,195 B2 * | 9/2013 | Bi | G06F 3/04886 345/168 |
| 8,701,004 B2 * | 4/2014 | Hoerentrup | G06F 3/0484 715/716 |
| 8,944,322 B2 | 2/2015 | White | |
| 9,105,026 B1 | 8/2015 | Edwards | |
| 9,129,274 B1 * | 9/2015 | Mocko | G06Q 20/20 |
| 9,164,982 B1 * | 10/2015 | Kaeser | G06F 17/2881 |
| 9,170,826 B2 * | 10/2015 | Brunswig | G06F 9/454 |
| 9,262,407 B1 * | 2/2016 | Ermann | G06F 17/28 |
| 9,304,664 B2 * | 4/2016 | Hoerentrup | G06F 3/0484 |
| 9,324,065 B2 * | 4/2016 | Mocko | G06Q 20/20 |
| 9,418,139 B2 * | 8/2016 | Moulinier | G06F 17/30616 |
| 9,582,570 B2 * | 2/2017 | Zheng | G06F 17/30669 |
| 9,741,211 B2 | 8/2017 | Skiles | |
| 9,881,287 B1 | 1/2018 | Edwards | |
| 2002/0133523 A1 * | 9/2002 | Ambler | G06F 9/454 715/265 |
| 2002/0153414 A1 | 10/2002 | Stoutenburg et al. | |
| 2002/0156683 A1 | 10/2002 | Stoutenburg et al. | |
| 2002/0166891 A1 | 11/2002 | Stoutenburg et al. | |
| 2002/0180868 A1 | 12/2002 | Lippert et al. | |
| 2003/0009694 A1 | 1/2003 | Wenocur et al. | |
| 2003/0046526 A1 * | 3/2003 | Zhang | G06F 9/454 713/1 |
| 2003/0132298 A1 | 7/2003 | Swartz et al. | |
| 2003/0144922 A1 | 7/2003 | Schrantz | |
| 2004/0102244 A1 | 5/2004 | Kryuchkov et al. | |
| 2004/0172236 A1 * | 9/2004 | Fraser | G06F 17/2827 704/4 |
| 2005/0039052 A1 | 2/2005 | O'Donnell et al. | |
| 2005/0204332 A1 * | 9/2005 | Krishnan | G06F 9/454 717/102 |
| 2006/0020469 A1 | 1/2006 | Rast | |
| 2006/0072136 A1 | 4/2006 | Hodder et al. | |
| 2006/0136220 A1 * | 6/2006 | Gurram | G10L 15/005 704/275 |
| 2006/0210026 A1 * | 9/2006 | Duplessis | G06F 9/454 379/88.05 |
| 2006/0224438 A1 | 10/2006 | Obuchi et al. | |
| 2007/0174140 A1 * | 7/2007 | Noonan | G06Q 30/06 705/26.1 |
| 2007/0230787 A1 * | 10/2007 | Belitskaya | G06K 9/723 382/182 |
| 2007/0288450 A1 * | 12/2007 | Datta | G06F 17/2217 |
| 2008/0048880 A1 | 2/2008 | Strickland et al. | |
| 2008/0121690 A1 | 5/2008 | Carani et al. | |
| 2008/0122656 A1 | 5/2008 | Carani et al. | |
| 2008/0136658 A1 | 6/2008 | Brask | |
| 2009/0005072 A1 | 1/2009 | Forstall et al. | |
| 2009/0077464 A1 * | 3/2009 | Goldsmith | G06F 3/0237 715/257 |
| 2009/0119092 A1 * | 5/2009 | Balasubramanyan | G06F 9/454 704/8 |
| 2009/0144650 A1 * | 6/2009 | Yoon | G06F 3/0238 715/780 |
| 2009/0259778 A1 | 10/2009 | Burge | |
| 2010/0007603 A1 | 1/2010 | Kirkup | |
| 2010/0057620 A1 | 3/2010 | Li et al. | |
| 2010/0073336 A1 | 3/2010 | Lee et al. | |
| 2010/0081475 A1 | 4/2010 | Chiang et al. | |
| 2010/0088632 A1 | 4/2010 | Knowles et al. | |
| 2010/0156939 A1 | 6/2010 | Lee | |
| 2010/0159996 A1 | 6/2010 | Rider et al. | |
| 2010/0182135 A1 | 7/2010 | Moosavi | |
| 2010/0197352 A1 | 8/2010 | Runstedler et al. | |
| 2011/0087990 A1 | 4/2011 | Ng et al. | |
| 2011/0090147 A1 | 4/2011 | Gervais et al. | |
| 2011/0176004 A1 | 7/2011 | Chaussade | |
| 2011/0220712 A1 | 9/2011 | Nakaeda | |
| 2012/0010886 A1 | 1/2012 | Razavilar | |
| 2012/0029691 A1 * | 2/2012 | Mockus | G06Q 20/18 700/232 |
| 2012/0050198 A1 | 3/2012 | Cannon | |
| 2012/0078741 A1 | 3/2012 | DeLine | |
| 2012/0081277 A1 | 4/2012 | de Paz | |
| 2012/0088544 A1 | 4/2012 | Bentley et al. | |
| 2012/0151415 A1 | 6/2012 | Park et al. | |
| 2012/0154293 A1 | 6/2012 | Hinckley et al. | |
| 2012/0215648 A1 * | 8/2012 | Rose | G06Q 20/12 705/16 |
| 2012/0256959 A1 | 10/2012 | Ye et al. | |
| 2012/0260218 A1 | 10/2012 | Bawel | |
| 2012/0290287 A1 * | 11/2012 | Fux | G06F 9/454 704/8 |
| 2013/0132091 A1 * | 5/2013 | Skerpac | G10L 17/005 704/273 |
| 2013/0153656 A1 | 6/2013 | Skiles | |
| 2013/0155595 A1 | 6/2013 | Herring et al. | |
| 2013/0226800 A1 | 8/2013 | Patel et al. | |
| 2014/0002407 A1 | 1/2014 | Badaye et al. | |
| 2014/0028541 A1 | 1/2014 | Truong et al. | |
| 2014/0039872 A1 * | 2/2014 | Patel | G06F 9/454 704/2 |
| 2014/0075286 A1 | 3/2014 | Harada | |
| 2014/0152507 A1 | 6/2014 | McAllister | |
| 2014/0172607 A1 | 6/2014 | Skiles | |
| 2014/0236568 A1 * | 8/2014 | Satpute | G06F 17/275 704/3 |
| 2014/0252089 A1 | 9/2014 | Bostwick | |
| 2015/0001291 A1 * | 1/2015 | Govindarajan | G06Q 90/00 235/380 |
| 2015/0025967 A1 * | 1/2015 | Ellison | G06Q 30/0261 705/14.53 |
| 2015/0095241 A1 | 4/2015 | Edwards | |
| 2015/0100498 A1 | 4/2015 | Edwards | |
| 2015/0194024 A1 * | 7/2015 | Govindarajan | G06Q 90/00 235/382 |
| 2015/0199882 A1 | 7/2015 | Fernando et al. | |
| 2015/0206128 A1 * | 7/2015 | Torossian | G06Q 20/3278 705/21 |
| 2015/0220217 A1 * | 8/2015 | Alshafai | G06F 9/454 715/703 |
| 2015/0261314 A1 | 9/2015 | Herring et al. | |
| 2015/0363757 A1 * | 12/2015 | Mocko | G06Q 20/20 705/16 |
| 2016/0005020 A1 | 1/2016 | Fernando et al. | |
| 2016/0012465 A1 | 1/2016 | Sharp | |
| 2016/0051067 A1 * | 2/2016 | Law | F16M 11/041 361/679.22 |
| 2016/0124627 A1 * | 5/2016 | Beatty | G06Q 20/20 705/16 |
| 2016/0125449 A1 * | 5/2016 | Beatty | G06Q 30/0238 705/14.38 |
| 2016/0148182 A1 * | 5/2016 | Craine | G06Q 20/20 705/16 |
| 2016/0358147 A1 | 12/2016 | Edwards et al. | |
| 2017/0221035 A1 | 8/2017 | Edwards et al. | |
| 2017/0262892 A1 * | 9/2017 | Fernando | G06Q 20/203 |
| 2017/0311737 A1 | 11/2017 | Law et al. | |

(56) References Cited

U.S. PATENT DOCUMENTS

2018/0039965 A1 2/2018 Han et al.
2018/0056179 A1* 3/2018 Rose .................. G06Q 50/01

FOREIGN PATENT DOCUMENTS

| | | |
|---|---|---|
| JP | 2001-118147 A | 4/2001 |
| JP | 2001-256559 A | 9/2001 |
| JP | 2003-272047 A | 9/2003 |
| JP | 2009-503652 A | 1/2009 |
| JP | 2012-178011 A | 9/2012 |
| JP | 2013-041460 A | 2/2013 |
| WO | 2013/055758 A1 | 4/2013 |
| WO | 2015/191468 A1 | 12/2015 |

OTHER PUBLICATIONS

Non Final Office Action dated Feb. 13, 2015, for U.S. Appl. No. 14/042,525, of Edwards, T.J., filed Sep. 30, 2013.
Notice of Allowance dated May 5, 2015, U.S. Appl. No. 14/301,621, of Mocko, C.L, et al., filed Jun. 11, 2014.
Notice of Allowance dated May 11, 2015, for U.S. Appl. No. 14/042,525, of Edwards, T.J., filed Sep. 30, 2013.
Restriction Requirement dated May 18, 2015, for U.S. Appl. No. 14/301,603, of Mocko, C.L., et al., filed Jun. 11, 2014.
Non Final Office Action dated Sep. 9, 2015, for U.S. Appl. No. 14/301,603, of Mocko, C.L., et al., filed Jun. 11, 2014.
Notice of Allowance dated Dec. 21, 2015, for U.S. Appl. No. 14/301,603, of Mocko, C.L, et al., ffiled Jun. 11, 2014.
International Search Report and Written Opinion for International Application No. PCT/US2015/034727, dated Sep. 3, 2015.
Notice of Acceptance for Australian Patent Application No. 2015274903, dated Feb. 22, 2017.
First Examination Report for Australian Patent Application No. 2017202569, dated Apr. 28, 2017.
Non-Final Office Action dated May 25, 2017, for U.S. Appl. No. 14/749,980, of Edwards, T.J., filed Jun. 25, 2015.
English-language translation of Notification of Reasons for Refusal for Japnese Patent Application No. 2017-517195, dated Jan. 4, 2018.
Non-Final Office Action dated Feb. 20, 2018, for U.S. Appl. No. 15/793,187, of Mocko, C.L., et al., filed Oct. 25, 2017.
Extended European Search Report for European Patent Application No. 15807035.9, dated Dec. 13, 2017.
Notice of Allowance dated Sep. 12, 2017, for U.S. Appl. No. 14/749,980, of Edwards, T.J., filed Jun. 25, 2015.

* cited by examiner

DETERMINING LANGUAGES FOR A MULTILINGUAL INTERFACE

RELATED APPLICATIONS

This application claims priority to and is a divisional application of U.S. patent application Ser. No. 14/301,603, filed on Jun. 11, 2014, the entire contents of which are incorporated herein by reference.

BACKGROUND

People often conduct transactions in person with merchants for acquiring many different types of goods and services. However, merchants and/or the employees of the merchants do not always speak the same language as their customers. Consequently, it can sometimes be challenging for merchants and customers to communicate information during an in-person transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
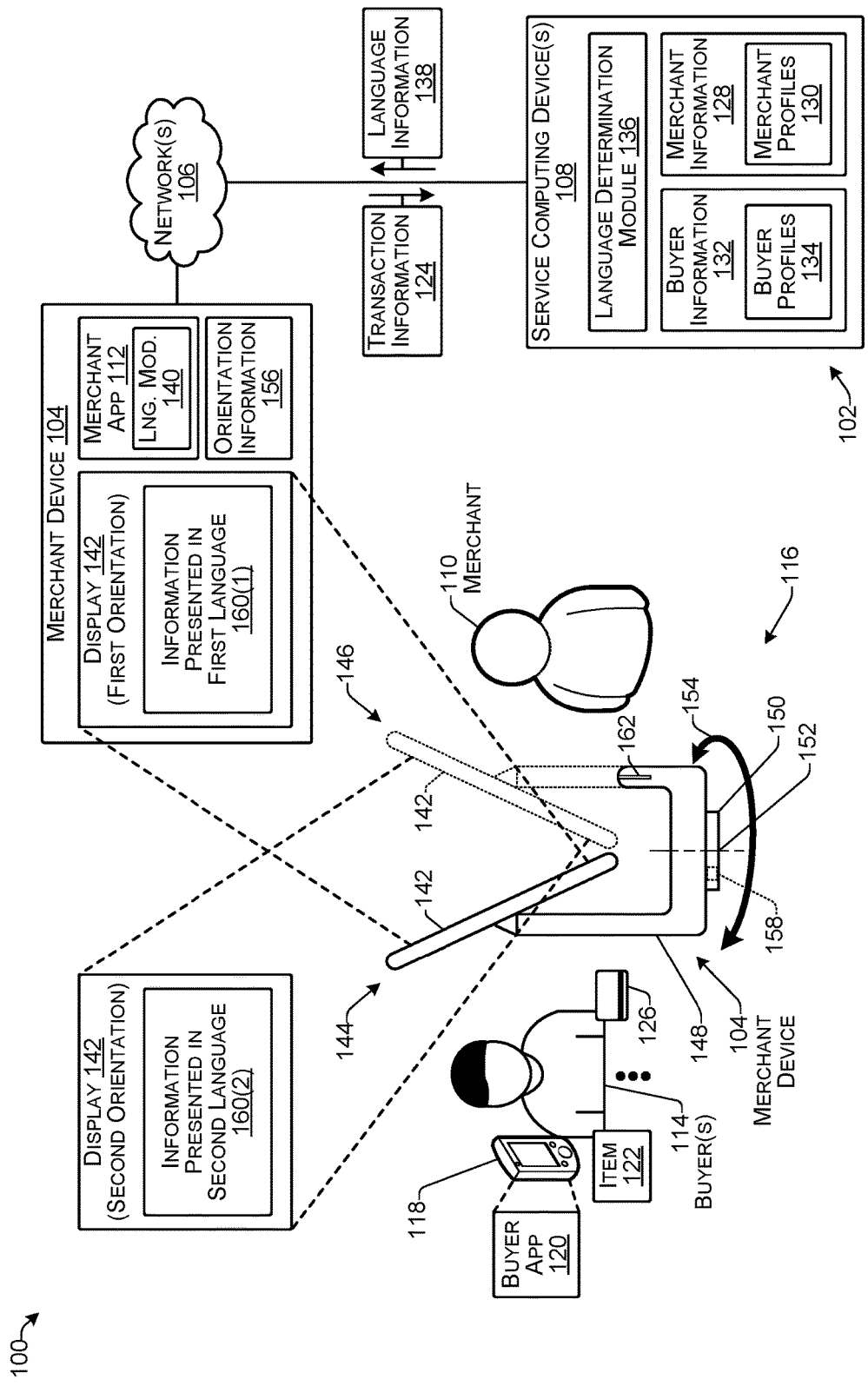
FIG. 1 illustrates an example environment for a multilingual payment service according to some implementations.

Some implementations described herein include techniques and arrangements for enabling a multilingual transaction between a merchant and a buyer. For instance, a computing device or other merchant device at a point of sale (POS) location may present information to a merchant in a first language, and may present information to a buyer in a second, different language. In some cases, the merchant device may switch between the different languages in response to detecting a change in the physical orientation of a display associated with the merchant device. For instance in a first orientation, in which the display is facing a direction associated with the merchant, the merchant device may present information in a first language that is preferred by the merchant. Upon detecting rotation or other change in orientation of the display of the merchant device (e.g., indicating that the display is facing a different direction to be viewable by a buyer), the merchant device may present information in a second language indicated to be preferred by the buyer.

In some cases, in addition to, or as an alternative to switching between languages, the merchant device may control access to certain application or device features based on the detected orientation of at least the display of the merchant device. For instance, the merchant device may present a first user interface (UI) on a touchscreen display. The first UI may include one or more virtual controls enabling entry of information for a transaction, such as for enabling the merchant to select one or more items that a buyer desires to purchase. When the merchant has completed entry of information related to the transaction, the merchant device may present a second UI intended for presentation to the buyer. For instance, the second UI may include one or more virtual controls to enable the buyer to enter information or otherwise perform actions toward completion of the transaction. In some examples, the second UI may be presented on the display before the merchant rotates or otherwise changes the position of the display to face the buyer. In other examples, the second UI may be presented on the display in response to the merchant device detecting rotation or other change in the position of the display. In either event, the merchant device receives an indication of a change in the physical orientation of the display, e.g., movement of the display from a first orientation, viewable by the merchant, to a second orientation, viewable by a buyer.

The merchant device may present the second UI on the display, and the buyer may interact with the second UI. As several examples, the buyer may enter a signature for a payment card, enter an amount for a tip, enter contact information for receiving a receipt, enter other types of buyer information, e.g., in response to a question, or enter other types of information for enabling completion of the transaction. Thus, the second UI may enable touch-based entry of information by the buyer for completing the buyer's stage of the transaction. When the buyer has completed interaction with the second UI, the display may be reoriented back to face the merchant. Based at least in part on the change in orientation of the display from the second orientation back to the first orientation, the merchant device may enable initiation of a new transaction by the merchant. In other words, when the display is facing the direction associated with the buyer, only the buyer UI is presented, and the buyer is unable to access the merchant interface, and is thereby unable to initiate a new transaction, or perform other actions that are properly performed only by the merchant. Subsequently, when the merchant device detects that the display has been returned to the first orientation, i.e., facing the direction associated with the merchant, the merchant is able to initiate a new transaction or perform other functions on the merchant device that buyers may be restricted from performing.

In some examples, in response to detecting the change in display orientation from the second orientation back to the first orientation, the merchant device may automatically present another interface on the display that enables the merchant to begin a new transaction. Alternatively, as another example, in response to detecting the change in display orientation from the second orientation to the first orientation, the merchant device may enable certain virtual controls, such as one or more touchscreen virtual buttons or icons that were inactive in the second orientation, but which are able to be selectable in the first orientation. For instance, a "start new transaction" button may be able to be selected by the merchant in the first orientation, whereas if the buyer had attempted to select the "start new transaction" button while the display was in the second orientation, the merchant device may ignore the attempted selection based on a determination that the display is in the second orientation.

As used herein, a merchant may include any business or other entity engaged in offering goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a buyer may include any entity that acquires goods or services from a merchant, such as by purchasing, renting, leasing, borrowing, licensing, or the like. Buyers may include customers and/or potential customers of a merchant. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant. Accordingly, as used herein, a transaction, such as a POS transaction, may include a financial transaction between a buyer and a merchant for the acquisition of one or more items, such as at a POS location.

In some examples, a service provider may provide language information about a particular buyer to a merchant. For instance, the service provider may provide a payment service to the merchant, and may provide the language information in association with providing the payment service. The payment service provided by the service provider may include the provision of software, hardware and/or payment processing services to the merchant to enable the merchant to receive payments from buyers and to otherwise conduct POS transactions with buyers.

The service provider may provide the payment service to a large number of merchants, and as a result, the service provider may receive POS transaction information for a large number of POS transactions that are conducted between buyers and merchants at a plurality of respective POS locations for a variety of items. The service provider may organize the received transaction information into respective merchant profiles and buyer profiles associated with the respective merchants and buyers participating in the respective POS transactions. Thus, the service provider may associate the transaction information for specific transactions with respective buyer profiles associated with respective buyers who conducted the transactions. A buyer profile associated with a particular buyer may contain buyer identifying information that indicates information about the buyer, and item purchase information that indicates details of items purchased, amount paid, time and place of the transaction, and so forth.

In some examples, based on the information included in the buyer profiles, the service provider may be able to determine a preferred language of a particular buyer and can associate the preferred language with the buyer profile of that buyer. For instance, when paying for a POS transaction, a buyer may provide the payment that is due to a merchant using any of cash, a check, a payment card, or an electronic payment account, such as may be accessed using a buyer device carried by the buyer. During the POS transaction, the merchant device can send, to the service provider, payment information in addition to other transaction information, such as a description of the items selected by the buyer, prices of the items selected, a time, place and date of the transaction, and so forth. In addition, the merchant device can often include buyer identifying information with the transaction information sent to the service provider. For instance, buyer identifying information may be determined from a payment card of the buyer, from an electronic payment account of the buyer, from a merchant club membership or other incentive program for which the buyer has signed up, or the like. As one example, the merchant may send payment card information of a buyer to the service provider to obtain authorization for transactions being conducted using the payment card as the payment instrument.

Based on the buyer identifying information, the service provider may identify a particular buyer profile corresponding to the buyer information received for the current transaction. If a particular language has already been associated with the particular buyer profile, the service provider may send at least an indication of the particular language to the merchant device prior to completion of the current transaction. For example, the language information may be sent to the merchant device while the merchant device is waiting for credit card authorization or other payment authorization from the service provider. The merchant device may then use the language information to determine the language to present on the display to be viewed by the particular buyer.

Furthermore, in some examples, merchant profiles may also indicate a language preferred by a particular merchant or by particular employees of a particular merchant. As an example, suppose that a particular merchant logs in to an associated merchant device, and has previously indicated that Spanish is a preferred language. Accordingly, the merchant UI may be presented in Spanish to the particular merchant. Next, suppose that a buyer wishes to purchase an item from the particular merchant and provides a payment card to the merchant as a payment instrument. The merchant may swipe the payment card, and the card information may thereby be sent to the service provider. Based on the payment card information, the service provider may identify a buyer profile associated with the current buyer, and may further determine a preferred language of the current buyer, such as may have been previously associated with the buyer profile. Suppose that the preferred language associated with the buyer profile in this example is Japanese. The service provider may send, to the merchant device, a communication that indicates Japanese is the preferred language of the current buyer. In response, the merchant device may present the buyer UI in Japanese when the display of the merchant device is oriented toward the current buyer, and may present the buyer UI in Spanish, i.e., the language preferred by the merchant, when the display is oriented toward the merchant.

Various techniques may be used by the service provider for determining a language to associate with a buyer profile of a particular buyer. As one example, the buyer may expressly specify a preferred language such as when signing up for an electronic payment account with the payment service of the service provider. For example, as discussed additionally below, the buyer may be able to pay for transactions using an electronic payment account accessible through a buyer application installed on a buyer device, such as a smart phone, a wearable computing device, or other portable computing device carried by the buyer. Accordingly, when the buyer signs up for an account with the payment service, the buyer may provide an express indication of a preferred language, and the preferred language is then associated with the buyer profile of the particular buyer.

As another example, a merchant device may be configured make a query to the buyer, such as during a transaction. For example, when the merchant orients the display of the merchant device to face the buyer, if language information has not yet been associated with the buyer profile of the particular buyer, the buyer interface presented to the buyer may ask the buyer to select a preferred language. The selected preferred language may be associated with the profile of the current buyer. Subsequently, during future transactions, it is not necessary to ask the buyer to again select a preferred language, as the language information may be obtained from the buyer profile.

As still another example, the service provider may determine implicitly a preferred language of the particular buyer, such as from actions of the buyer or from other information obtained about the buyer. For example, suppose that the buyer provides an email address for receiving receipts for transactions. Furthermore, suppose that when the buyer accesses the email receipts, the buyer uses a browser that is set to a particular language, such as German. For instance, the browser locale may have been set to Germany or the user may have otherwise indicated German as a preferred language to the browser. As one example, an HTTP (hypertext transfer protocol) accept-language header received by the service provider when the buyer uses the browser to access the receipts may indicate the language preferred by the buyer. Accordingly, based on the buyer accessing the email receipts primarily using a web browser that is set to the German language, this language may be implicitly associated with the buyer profile as a preferred language of the particular buyer. Numerous other techniques for determining a preferred language of a particular buyer will be apparent to those of skill in the art having the benefit of this disclosure.

In addition, various techniques may be used for determining the orientation of the display of the merchant device, such as whether the display is currently viewable by the merchant or by the buyer. As one example, when the display is mounted on a stand, rotation or other repositioning of the display may be detected by a switch included in the stand. Additionally or alternatively, the merchant device may include one or more sensors such as an accelerometer, gyroscope, compass, or the like, that can detect when the orientation of the display has been changed from a first orientation to a second orientation. Furthermore, in some examples, facial recognition, body recognition, environment recognition, audio recognition, and/or biometric sensing, such as fingerprint scanning, may be used for determining whether the display is currently facing the merchant or the buyer. For example, the merchant device may include a camera associated with the display and the merchant device may be trained to recognize the two different orientations based on input from the camera. As one example, when a wall-mounted menu is detectable in the background, the display may be facing the merchant, whereas when a door to the store is detectable in the background, the display may be facing a buyer. As still another example, the merchant device may include a control that the merchant may select prior to reorienting the display to switch between the language preferred by the merchant and the language preferred by the buyer.

For discussion purposes, some example implementations are described in the environment of a merchant device that is used in conjunction with a payment service for conducting POS transactions. However, implementations herein are not limited to the particular examples provided, and may be extended to other environments, other system architectures, other applications, and so forth, as will be apparent to those of skill in the art in light of the disclosure herein.

FIG. 1 illustrates an example environment 100 for a payment service and a language information service according to some implementations. For instance, the environment 100 may enable a service provider 102 to provide a payment service in which merchants are able to conduct POS transactions with a plurality of buyers, such as for selling items to the buyers. Further, the environment 100 may enable the service provider 102 to provide language information to assist the merchants in determining a language that may be preferred by a customer during a POS transaction. Examples of various different languages that may be used in some implementations herein may include English, Spanish, Japanese, French, Tagalog, Mandarin, Hindi, Korean, German, Portuguese, Russian, Arabic, Bengali, Punjabi, Vietnamese, Dutch, Italian, Swedish, Norwegian, Danish, Finnish, and Hebrew, to name a few. Further, in some examples one dialect of a particular language may be a first language, while another dialect of the particular language may be a second language.

In the illustrated example, a merchant device 104 is able to communicate over one or more networks 106 with one or more service computing devices 108 of the service provider 102. Further, the merchant device 104 may be associated with a merchant 110. Additionally, in some examples, a plurality of other merchant devices (not shown in FIG. 1) may be associated with a plurality of other merchants who may also participate in the payment service provided by the service provider 102. The merchant device 104 may include an instance of a merchant application 112 that executes on the merchant device 104. The merchant application 112 may provide POS functionality to the merchant device 104 to enable the merchant 110 to accept payments from one or more buyers 114 at a POS location 116. For example, the merchant 110 may use the merchant device 104 to accept payments from various different types of payment instruments, e.g., payment cards, electronic payment, cash or check, at the POS location 116 from the one or more buyers 114.

In some types of businesses, the POS location 116 may correspond to a store or other place of business of the merchant 110, and thus, may be a fixed location that typically does not change on a day-to-day basis. In other types of businesses, however, the POS location 116 may change from time to time, such as in the case that the merchant 110 operates a food truck, is a street vendor, a cab driver, or has an otherwise mobile business, e.g., in the case of merchants who sell items at buyers' homes, buyers' places of business, and so forth.

Further, the physical orientation of the merchant device 104 may be changed during a transaction. For instance, the change in physical orientation may cause the merchant application 112 executing on the merchant device 104 to switch between a first language that is preferred by the merchant 110, and a second language that has been indicated to be preferred by a particular buyer 114 participating in the current transaction. Additionally, or alternatively, the physical orientation of the merchant device 104, i.e., the direction that the electronic display screen of the merchant device 104 is currently facing, may be used to control which features of the merchant application 112 are accessible on the merchant device 104.

In some examples, the buyer 114 may have a buyer device 118 that can execute a buyer application 120. For instance, some buyers 114 may carry buyer devices 118, such as smart phones, tablet computers, wearable computing devices, or the like, as further enumerated elsewhere herein, and some of these buyer devices 118 may have installed thereon the buyer application 120. The buyer application 120 may include electronic payment capability, which enables the buyer 114 to make a payment to the merchant 110 using the buyer application 120, rather than paying with a physical payment card, cash, check, etc.

The buyer application 120 may further enable the buyer 114 to check in with the particular merchant 110, e.g., at the merchant's store or prior to entering the merchant's store, such as when the buyer is within a certain distance from the merchant device 104, the merchant's address, etc. For example, the buyer 114 may check in with the merchant 110 to place an order for an item 122. As one example, the buyer 114 may be able to place the order for the item 122 through the buyer application 120, may skip waiting in a line for ordering items, may pay for the transaction using the buyer application 120, and may proceed directly to an area of the merchant's store to pick up the ordered item 122. Through communication with the service computing device 108, or through direct communications between the buyer device 118 and the merchant device 104, the buyer's order may be automatically provided to the merchant device 104.

Regardless of the type of payment instrument used, the merchant 110 and the buyer 114 may conduct a transaction by which the buyer 114 acquires the item 122 from the merchant 110 at the POS location 116. The merchant application 112 on the merchant device 104 may send transaction information 124 to the service computing device 108, e.g., while the transaction is being conducted at the POS location 116. In other examples, such as if the merchant device 104 is processing transactions offline, the transaction information 124 may be sent in a batch at a subsequent point in time or using other suitable techniques.

The transaction information 124 may include information regarding the time, place, and the amount of each respective transaction, information related to the item 122 acquired, a type of payment being used (e.g., cash, check, payment card, electronic payment), as well as additional information, such as buyer identifying information. For instance if a payment card 126, such as a credit card, debit card, charge card, prepaid card, or the like, is used as a payment instrument, the transaction information 124 can include data stored in the payment card, e.g., Track 1 data (cardholder name, card number and other card information). In addition, when completing the transaction, a buyer 114 may sometimes provide an email address for receiving a receipt through email, a phone number for receiving a receipt via text message, or the like. Other examples of transaction information 124 that can be captured include item purchase information, such as detailed item information, e.g., an itemized listing of the items being acquired, the price being paid for each item, descriptors of the items (size, flavor, color, etc.), geolocation data indicating a geographic POS location of a particular transaction, online/offline card data, data describing the merchant 110 and/or the merchant device 104, e.g., a merchant identifier, a merchant category code (MCC), or the like. Additionally, in some examples the transaction information 124 may include any type of data that is received upon a buyer's authentication into a social network, if any, buyer identification information obtained from a merchant club card, points program, or other incentive programs, and various other types of information, as discussed additionally below.

The service computing device 108 may also receive transaction information from a plurality of other merchant devices (not shown in FIG. 1) associated with a plurality of other merchants. For example, a large number of other merchants may also operate their own merchant devices for conducting transactions via the payment service. Accordingly, the transaction information from the merchant devices associated with the other merchants may also be received by the service computing device 108.

The service computing device 108 may receive the transaction information 124 and may associate the transaction information 124 with merchant information 128 maintained by the service computing device 108. For example, the transaction information 124 may be associated with a particular merchant profile 130 corresponding to the merchant 110. Thus, the service provider 102 may maintain a plurality of merchant profiles 130, such that each merchant registered with the payment service may be associated with a respective merchant profile 130 that includes transaction information for transactions conducted by that merchant with one or more associated merchant devices.

In addition, the service computing device may extract buyer information 132 from the transaction information 124. Based in part on the buyer information, the service provider may associate transaction information 124 for a particular transaction with a respective buyer profile 134 of a plurality of buyer profiles 134 maintained by the service provider 102. For example, if a payment card 126 is used as the payment instrument, the transaction information 124 for a particular transaction may include a payment card identifier of the payment card 126, and may further include the name of the holder of the payment card 126. Accordingly, a particular buyer profile 134 may be associated with an identifier of the payment card 126 and/or the name corresponding to the holder of the payment card. Additional transaction information from the particular transaction may be related to this buyer profile, such as the POS location of the transaction, the amount of the transaction, the time and date of the transaction, the items acquired through the transaction, descriptive information about the items acquired, the price paid for the items, and so forth.

In some examples, the service computing device 108 may include a language determination module 136 that examines the data in the buyer profiles 134 and/or the merchant profiles 130 to determine one or more languages to be used by a particular merchant device 104 during a particular transaction. For example, the language determination module 136 may receive transaction information 124 for a current transaction, and, in response may send language information 138 to the merchant device 104 while the transaction is still ongoing. As one example, the language information 138 may indicate a preferred language associated with a particular buyer profile corresponding to the buyer conducting the current transaction. As another example, if there is no preferred language associated with the particular buyer profile, the language information 138 may indicate this and, in some examples, may further include an instruction that causes the merchant device 104 to display a screen to the buyer that requests the buyer select a preferred language. Alternatively, the language selection screen may be displayed to the merchant, who may verbally request the preferred language from the buyer.

Additionally, or alternatively, the merchant application 112 may include a language module 140 that may determine a language to present at various stages of a transaction, either independently, or based on the language information 138 that may have been received from the service computing device 108. As one example, a plurality of user interface screens or other components in various different languages may be provided to the merchant device 104 preconfigured in the various different languages as part of the merchant application 112. As another example, the user interfaces may be translated to other languages as needed by the language module 140.

As one example, suppose that a merchant 110 (or a particular employee of the merchant) prefers a first language, such as French. However, suppose that the merchant 110 performs transactions at a point-of-sale location 116 where most of the customers of the merchant prefer a second language, such as English. Accordingly, the merchant 110 may configure a language preference in a merchant profile to indicate that the preferred language of the merchant is French. At least a portion of the merchant profile may be stored locally on the merchant device 104 as well as at the service computing device 108.

When the merchant 110 logs in to the merchant device, the language module 140 may determine the preferred language of the merchant 110 as a result, user interfaces that are presented to the merchant 110 are presented in the first language, e.g., French, while the user interfaces that are presented to the buyers 114 are automatically presented in the second language, i.e., English, by default. For instance, when the merchant device 104 detects a change in the orientation of the merchant device 104, which may be indicative that an interface is being presented to the buyer 114, the interface may be presented in the default language. This implementation may be employed regardless of whether the merchant device 104 is operating in an offline or online mode. Additionally, in some examples, the language determination module 136 and/or the language module 140 can use demographics of a particular POS location for setting a default language to be used by the merchant device 104. Furthermore, different employees of the merchant may have different language preferences set, such that when a particular employee logs in, the language preference of that employee may be used during the session during which the employee is logged in.

In the example of FIG. 1, the merchant device 104 includes a display 142 that may present information to the merchant 110 when positioned in a first orientation 144 and to the buyer 114 when positioned in a second orientation 146. In some examples, the display 142 may be a touchscreen display able to receive touch-based user inputs, although other types of displays and input devices may be used in other examples. As one example, the display 142 may be part of a tablet computing device or otherwise associated with a computing device that executes the merchant application 112 to provide the functionality of the merchant device 112.

In the illustrated example, a support 148 is configured to support the display 142 in the first orientation 144, e.g., facing a first direction, and may be positioned to the second orientation 146, e.g., facing a second direction generally away from the first direction. For instance, in the first orientation 144, the display 142 may not be easily visible to a buyer standing on a buyer side of the merchant device, whereas when the display 142 is repositioned to face the buyer in the second orientation 146, the display 142 may not be easily visible to the merchant located on the merchant side of the merchant device.

As one example, the support 148 may be a stand of plastic, metal or other suitable material that includes a swivel base 150 that allows the support 148 and the display 142 to be pivoted around a vertical pivot axis 152, as indicated by arrow 154. In some examples, the rotation of the support on the base 150 may be performed manually by the merchant 110 or the buyer 114. In other examples, the rotation may be automated, such as by a motor (not shown in FIG. 1), and controlled by the merchant application 112, or by a control controlled manually by the merchant. Thus, regardless of the source of motivation, the merchant device 104 may rotated around the pivot axis 152 to reposition the display 142 between the first orientation 144 and the second orientation 146.

One or more of various different types of sensors may be used to provide orientation information 156 to the merchant application 112. The orientation information 156 may indicate a change between the first orientation 144 and the second orientation 146. As one example, a switch 158 may be associated with the base 150 for detecting relative motion between the support 148 and the base 150. Accordingly, rotating the merchant device 104 from the first orientation 144 to the second orientation 146 may actuate the switch 158. The switch 158 may send, as the orientation information 156, a signal to a processor (not shown in FIG. 1) of the merchant device 104 to provide an indication that at least the display 142 has been rotated from the first orientation 144 to the second orientation 146. Any suitable type of switch may be used, such as mechanical, electromechanical, electronic, etc.

As one example, information 160(1) may be presented on the display 142 when the display 142 is in the first orientation 144. For instance, the information 160(1) may be presented in a first language. The support 148 and the display 142 may be rotated to the second orientation 146, which may trip or otherwise actuate the switch 158. In response to the orientation information 156 from the switch 158, the merchant application 112 may present information 160(2) on the display 142 when the display 142 is in the second orientation 146. As one example, the information 160(2) may be a translated version of the information 160(1) in the second language. As another example, the information 160(2) may be different information written in the second language that is intended for viewing and/or interaction by the buyer. When the display 142 and support 148 are rotated back to the first orientation 144, the switch 158 may be actuated again, or may otherwise provide an indication that the display 142 has returned to the first orientation 144. In response, the information 160(1) may be again presented in the first language, or different information presented on the display 142 may be presented in the first language.

Additionally, or alternatively, numerous other types of sensors (not shown in FIG. 1) may be used for determining a change in the orientation of the display 142. For example, the merchant device 104 may include onboard sensors such as an accelerometer, a compass, a gyroscope, a proximity sensor, or the like, which may detect a change in the orientation of the display 142. As one particular example, the merchant device 104 may include a tablet computing device that provides the display 142 and the sensors, and which is mounted on the support 148. Additionally, or alternatively, one or more sensors may be included in the support 148. Accordingly, the sensors of the merchant device 104 may detect a change in orientation of at least the display 142, and may provide sensor information as the orientation information 156 to the merchant application 112. In response, the merchant application 112 may present the information 160(2) on the display 142 to the buyer 114 in the second language based on the change in the orientation of the display 142 to the second orientation 146.

As another example, the merchant device 104 may include a camera (not shown in FIG. 1) associated with the display 142. The merchant 110 may train the merchant device 104 to recognize the two different orientations 144 and 146 based on input from the camera. For instance, the merchant application 112 may include a training and recognition feature that enables the merchant 110 to train the merchant application 112 to recognize the merchant 110 and/or the surrounding environment to enable the merchant application 112 to recognize a current orientation of the display 142. For example, a current image received from the camera may serve at least in part as orientation information 156, to indicate a current direction that the display 142 is facing. Thus, the merchant application 112 may use facial recognition, body recognition, environment recognition, or the like, to recognize the current orientation of the display 142.

Additionally, or alternatively, the merchant application 112 may use audio recognition and/or biometric sensing to distinguish the merchant 110 from buyers 114. For example, a microphone of the merchant device 104 may enable voice recognition such that the merchant 110 may provide a voice command when the display is oriented for viewing by the merchant. For instance, the voice command may cause the merchant application 112 to initiate a new transaction.

As another example, the merchant device may include a fingerprint sensor or other biometric sensor that the merchant is able to touch when the display is oriented for viewing by the merchant. For instance, the merchant may have previously provided authentication information for associating a fingerprint with the merchant device 104. Thus, the merchant 110 may touch the fingerprint sensor to initiate a new transaction, whereas if a buyer were to touch the fingerprint sensor, the input may be ignored, as the fingerprint is not recognized.

As another alternative, the merchant device 104 may include a physical button or other control that is not rotated with the display 142, and that the merchant 110 may select when the display 142 is rotated back to the face the merchant. For instance, selection of the physical control may indicate to the merchant application that display 142 is oriented toward the merchant. Thus, the merchant application may display to interfaces in the first language of the merchant, and furthermore when orientation is used for access control, and access is permitted to merchant interfaces e.g., for initiating a new transaction, for cancelling a transaction, for changing merchant application settings, etc. Furthermore, while several examples have been provided, numerous other techniques for detecting a change in the orientation of the display 142 and/or the merchant device 104 will be apparent to those of skill in the art having the benefit of the disclosure herein.

In some instances, the merchant 110 can interact with the merchant device 104 to specify a language preferred by the merchant 110 when using the merchant device 104. For example, each employee of the merchant 110 may be able to specify a preferred language, and upon logging in to the merchant device 104, the merchant application 112 may present merchant interfaces in the preferred language. Thus, the merchant application 112 may present one or more UIs (not shown in FIG. 1) to the merchant 110 in a preferred language. Additionally, in some examples, the preferred language of the merchant may be inferred, such as based on a language that the merchant 110 uses when signing up for the payment service. In either event, the preferred language of a merchant or particular merchant employee may be associated with the respective merchant profile 130, at least part of which, as mentioned above, may be stored locally on the merchant device 104 such as to enable multi-language functionality when the merchant device 104 is in an off-line mode.

As one example, suppose that the merchant 110 prefers English and has previously indicated this preference to the language module 140 on the merchant device 104. Accordingly, when the merchant 110 is logged in to the merchant device 104, the language module 140 may cause the merchant application 112 to present information 160(1) to the merchant 110 in English. Suppose that the buyer 114 has selected the item 122 for purchase and wishes to pay with an electronic payment account through the buyer application 120. The buyer 114 may check in with the merchant device 104 via the buyer application 120. The merchant device 104 and or the buyer device 118 may send transaction information 124 to the service computing device 108. The service computing device 108 may determine a particular buyer profile 134 that corresponds to the particular buyer 114 and/or buyer device 118. The language determination module 136 may inform the merchant device 104 of the preferred language associated with the particular buyer profile 134 by sending the language information 136 to the merchant device 104. For example, the language information 136 may include at least the name or other identifier of the preferred language.

The language module 140 of the merchant application 112 may use the language information 136 to determine the language of the UIs to be presented to the buyer 114. For example, the merchant 110 may rotate the merchant device 104 so that the display 142 is in the second orientation 146, such as to enable the buyer 114 to sign or otherwise authorize the transaction for the item 122. Based on the language information 138 received from the service computing device 108, the merchant application 112 may present the information 160(2) in the language indicated in the buyer profile 134 to be preferred by the particular buyer. Following completion of the buyer stage of the transaction, the merchant device may be rotated back so that the display 142 again faces the merchant 110. Based on the language previously indicated to be preferred by the merchant 110, the merchant device 104 may present the information 160(1) in the language preferred by the merchant 110, which may be an indication that the transaction has been successfully completed.

As another example, if the buyer 114 instead chooses to pay with a payment card 126, the merchant 110 may enter the buyer's selection of item 122 into the merchant device 104 using a merchant UI as discussed additionally below. The merchant 110 may enter information for the transaction and request the payment card 126 from the buyer 114. The merchant 110 may swipe the payment card 126 in a card reader 162, which may be included with or associated with the merchant device 104, such as located in the stand 148. Payment card information, such as card number, card holder name, and other information about the transaction may be sent to the service computing device 108 as the transaction information 124. The service computing device 108 may match the card information with one of the buyer profiles 134, and may determine a preferred language associated with the identified buyer profile 134. The language determination module 136 may send the preferred language as the language information 138 to the merchant device 104, which may use the preferred language when presenting the information 160(2) to the buyer 114 as discussed above. Alternatively, if there is no preferred language associated with the particular buyer profile 134, the language determination module 136 may send, as the language information 138, a communication indicating that there is no preferred language and an instruction for the merchant device to request a preferred language from the particular buyer.

Figure 2:
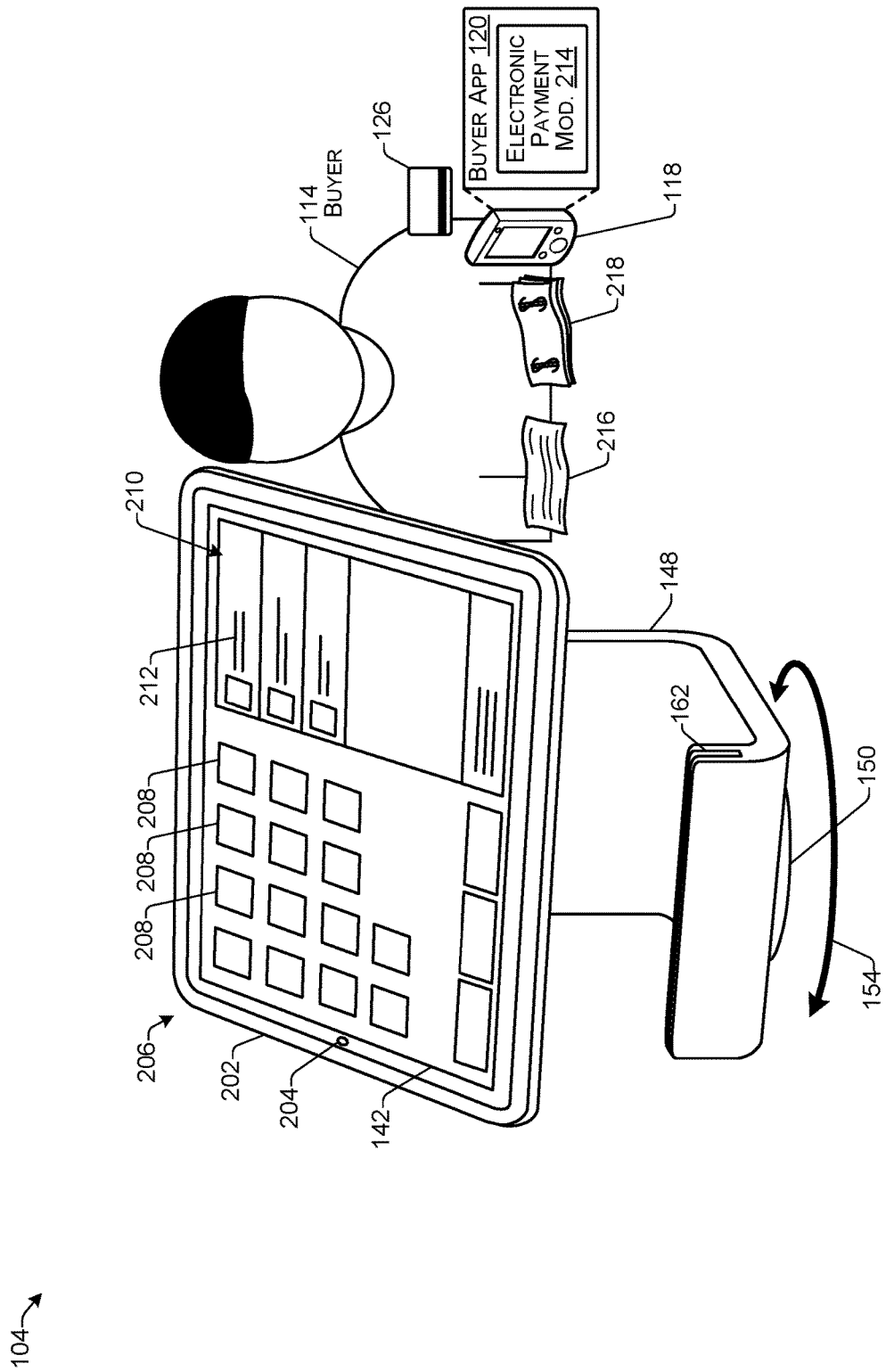
FIG. 2 illustrates an example merchant device for use with a multilingual payment service according to some implementations.

FIG. 2 illustrates an example of the merchant device 104 including an example merchant user interface for enabling a POS transaction between a merchant and a buyer according to some implementations. In this example, the merchant device 104 includes the stand 148, which supports the display 142 on the swivel base 150 to enable the display 142 to be rotated between a first orientation viewable by the merchant (not shown in FIG. 2) and a second orientation viewable by the buyer 114, as discussed above. The merchant device 104 further includes a frame 202 for holding the display 142 on the support 148 and a camera 204 that may be used for orientation recognition in some examples, as discussed above.

In this example, the merchant device 104 may present a first UI 206 to the merchant in a language preferred by the merchant. The first UI 206 may enable the merchant to enter one or more selections of the buyer 114 and determine an amount of payment due for the one or more selected items. For instance, the first UI 206 may include a plurality of icons other representations 208 of items that are offered by the merchant. In the case that the display 142 is a touchscreen, the merchant may enter selections such as by tapping on a representation 208 of a particular item selected by the buyer 114. The UI 206 may further include a selected items area 210 that indicates the items selected by the buyer 114 and a total amount of payment due for the transaction. Various portions of the UI 206 may include text 212, such as for descriptions of the items or for providing other information to the merchant. This text 212 may be presented in the language determined to be preferred by the merchant. When all the items selected by the buyer have been entered into the UI 206, the merchant may request a payment instrument from the buyer 114.

As mentioned above, the buyer 114 may use any of a variety of different payment instruments when participating in a POS transaction. For example, the buyer 114 may typically have a plurality of payment cards 126, such as credit cards, debit cards, prepaid cards, and so forth, which the buyer 114 may use for making payment. Furthermore, in addition to payment cards, a buyer 114 may carry a buyer device 118, as discussed above, which may include the buyer application 120. For example, the buyer application 120 may include an electronic payment module 214 that uses an electronic payment account of the buyer 114 for making electronic payments for transactions. In some cases, the electronic payment account of the buyer 114 may be linked to one of the buyer's payment cards, such as a credit card. Accordingly, the buyer application 120 may enable the buyer 114 to pay for a transaction with the linked credit card without having to produce the credit card, thereby enabling a card-less payment to the merchant with the credit card. As mentioned above, the buyer application 120 and the corresponding electronic payment account may be associated with a particular buyer profile that may include various buyer information including, for example, the buyer's name, information describing the payment card linked to the electronic payment account, and an email address linked to the electronic payment account to which receipts can be sent for electronic payment transactions that are conducted by the buyer 114 using the buyer application 120. Further, the particular buyer profile may indicate a preferred language of the particular buyer. For instance, the buyer may have indicated the preferred language when signing up for the electronic payment account, or when updating preferences for the electronic payment account, or the preferred language may have been determined by any of the other techniques described herein.

In addition to the above-discussed payment instruments, the buyer 114 may also optionally pay with a check 216 or cash 218. For example, if the buyer 114 pays with check 216 or cash 218, the merchant may sometimes also receive an identifier that provides additional identification information about the buyer 114. For instance, a merchant may have a club card, a points program, or other incentive program that enables identification of the buyer 114 to the merchant and thereby to the merchant application 112. As an example, as part of the merchant's incentive program, the buyer 114 may provide a telephone number, email address, club card, etc., and this buyer identifying information may be cross-referenced to associate a particular transaction with a particular buyer profile for determining a preferred language of the buyer if a preferred language has been associated with the buyer profile. Alternatively, if the buyer 114 pays with a check, the buyer 114 may be required by the merchant to provide buyer information in association with the check, which may include checking account number, telephone number, residential address, and other identification information. Accordingly, this information may also be associated with the particular transaction, and may thereby enable the transaction to be associated with a buyer profile. Thus, despite the different possible payment instruments that may be used, the service provider may often be able to associate a particular buyer with a buyer profile for that buyer and thereby determine whether a preferred language has been associated with the particular buyer.

Figure 3A:
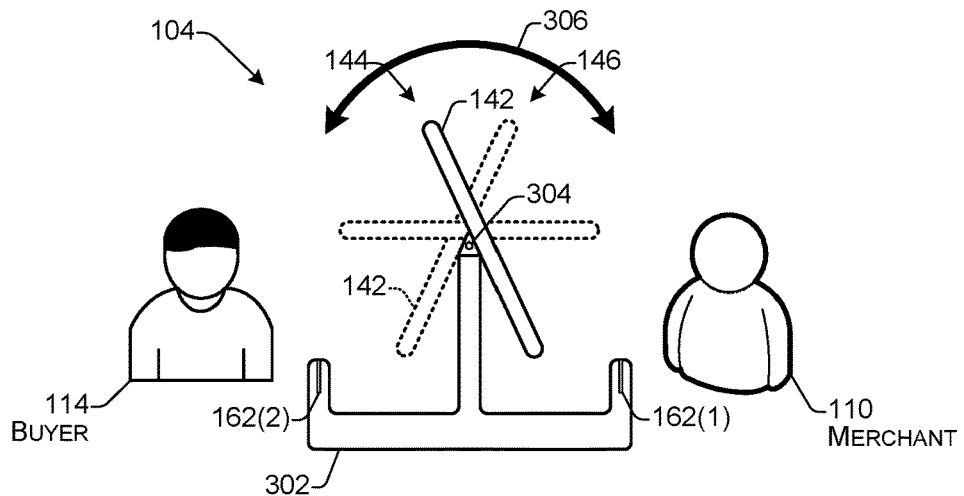
FIGS. 3A-3C illustrate examples of configurations of a merchant device able to be used for a multilingual payment service according to some implementations.
Figure 3B:
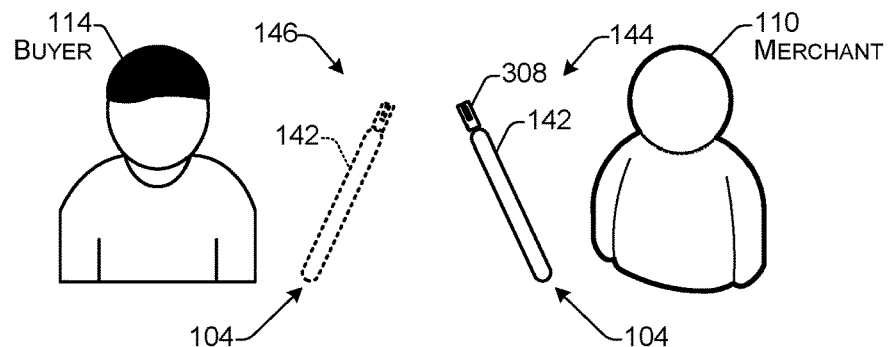
Figure 3C:
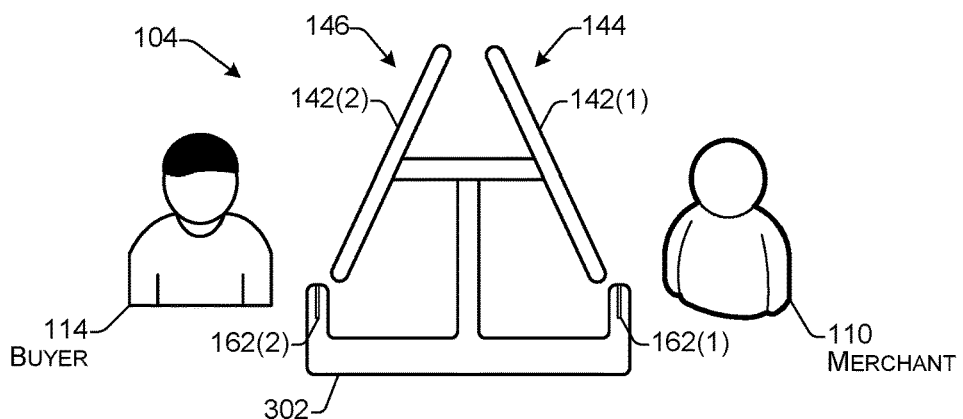

FIGS. 3A-3C illustrate several alternative examples of configurations of the merchant device according to some implementations. In FIG. 3A, the portion of the merchant device including the display 142 is mounted on a support 302 that includes a first card reader 162(1) and a second card reader 162(2). Furthermore, in this example, the support 302 includes a pivot axis 304 that enables the display 142 to be rotated about a horizontal pivot axis, as indicated by the arrow 306, rather than a vertical pivot axis as in the example of FIG. 1. Accordingly, the display 142 may be flipped about the horizontal pivot axis 304 between the first orientation 144 in which the display is facing a first direction e.g., toward the merchant, and the second orientation 146 in which the display is facing a second direction, e.g., away from the merchant and toward the buyer.

FIG. 3B illustrates another example of the merchant device 104 that does not include a support. In this example, the merchant device 104 is self-contained in a tablet computing device, smart phone, or other portable computing device that includes the display 142. A card reader 308 may be attached to the merchant device 104 such as by plugging into one or more ports of the merchant device 104. As one particular example, the card reader 308 may plug in to a microphone jack of the merchant device 104, and payment card information may be delivered by the card reader 308 to the merchant device 104 through the microphone jack. In the example of FIG. 3B, the merchant 110 may complete the merchant stage of the transaction such as by entering item information, and swiping the payment card of the buyer.

When the merchant application presents a buyer interface on the display 142, such as to enable the buyer to enter a signature for the payment card, the merchant may hand the merchant device 104 to the buyer to enable the buyer to entered the quest of information such as signature, receipt information etc. In response to the merchant handing the merchant device 104 to the buyer, the merchant device may detect a change in orientation based on orientation information receive one or more sensors on board the merchant device as discussed above, and make determine that the merchant device is now in the second orientation 146. For example, because the transaction has reached a point at which the buyer will be expected to make input, the merchant device 104 may be configured to determine that a handoff will soon occur, and may use one or more recognition algorithms for detecting input from one or more sensors that indicate the merchant device 104 has been handed to the buyer 114, and therefore the display is viewable from a different direction.

In response, to the handing of the merchant device 104 to the buyer 114, the merchant device 104 may present the buyer user interface in the language preferred by the buyer 114. When the buyer 114 has completed the buyer stage of the transaction, the buyer 114 may hand the merchant device 104 back to the merchant 110. In response to detecting that the orientation of the display 142 has returned to the first orientation 144, e.g., is facing a direction that is associated with the merchant, the merchant device 104 may present information in the language preferred by the merchant 110.

FIG. 3C illustrates another example of the merchant device 104 in which there is a first display 142(1) that is oriented facing in a direction associated with the merchant 110, and a second display 142(2) that is oriented facing in a direction associated with the buyer 114. In this example, rather than detecting a change in orientation the display, the merchant device 104 presents the information on the first display 142(1) in the language preferred by the merchant, and presents the information on the second display 142(2) in the language preferred by the particular buyer 114. For example, during the merchant stage of the transaction the buyer may be presented with an indication of the items selected and price, but may otherwise not be able to view the merchant interface presented on the first display 142(1). Thus, the information presented to the buyer may be in the buyer's preferred language, if known at this stage, such as if the buyer has checked in with the merchant, while the information presented to the merchant is presented in the merchant's preferred language. Subsequently, in response to receiving language information indicating the preferred language of the buyer, the interfaces presented to the buyer during the buyer stage of the transaction may be presented on the second display 142(2) in the preferred language of the buyer, while the interfaces presented to the buyer may be presented to the merchant on the first display 142(1) in the preferred language of the merchant. Furthermore, while several example configurations of merchant devices 104 have been described for discussion purposes, numerous other configurations will be apparent to those of skill in the art having the benefit of the disclosure herein.

Figure 4:
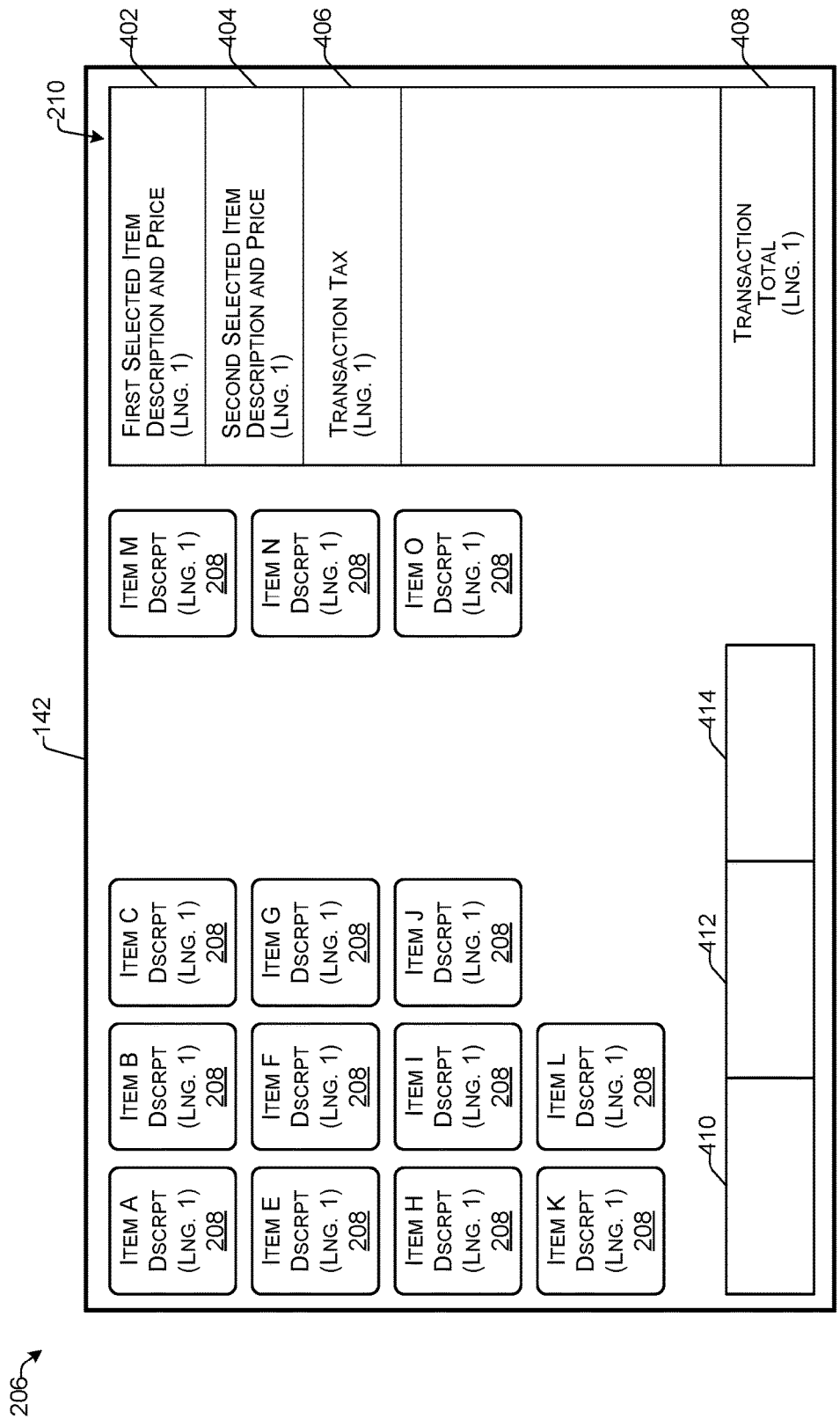
FIG. 4 illustrates an example interface enabling entry of an item selection according to some implementations.

FIG. 4 illustrates an enlarged view of the example user interface 206 discussed above with respect to FIG. 2 according to some implementations. For example, some types of transactions may include a merchant stage and a buyer stage. During the merchant stage, the merchant may be presented with the UI 206 or other suitable interface to enable the merchant to enter item information for one or more item selected for purchase by the buyer. In addition, in some examples, during the merchant stage, the merchant may receive a payment card of the buyer and may swipe the payment card in a card reader as described above. Alternatively, in some examples, the merchant may receive other identifying information of the buyer during the merchant stage. Subsequently, during the buyer stage of a transaction the buyer interacts with one or more interfaces, such as to provide a signature, to provide information for receiving a receipt, and/or to provide other buyer information. Thus in some examples, the buyer stage of the transaction serves to complete the transaction, and the merchant may subsequently proceed with a new transaction for the next buyer.

In the example of FIG. 4, the example UI 206 includes a plurality of item representations 208, as discussed above. In some examples, each item representation 208 may include an image (not shown) of a respective item and/or a text description of the respective item. Thus, in the illustrated example, item representations 208 are presented in the interface for a plurality of items A-O. Accordingly, in the case that the display 142 is a touchscreen display, the merchant may tap on one of the item representations 208 to select the corresponding item. Selected items are listed in the selected items area 210, which may include the text description of the selected item, an image of the selected item and a price of the selected item, as indicated at 402 and 404. The selected items area 210 may further include a transaction tax as indicated at 406 and a transaction total as indicated at 408. The interface 206 may include various other virtual controls 410, 412, and 414 for performing various other functions, such as changing settings of the merchant application, sending or receiving communications to and from the service provider, adding or removing items from the UI 206, and so forth.

As discussed above, in response to an indication of a preference from the merchant or a particular employee of the merchant, the UI 206 may be presented in a selected first language indicated to be preferred by the particular current user of the merchant device. Accordingly, the descriptions of each item in the item representations 208 and in the selected items area 210 may be presented in the first language. Further, if the merchant accesses other features of the merchant application such as through the virtual controls 410-414, those UIs may also be presented in the first language.

Figure 5A:
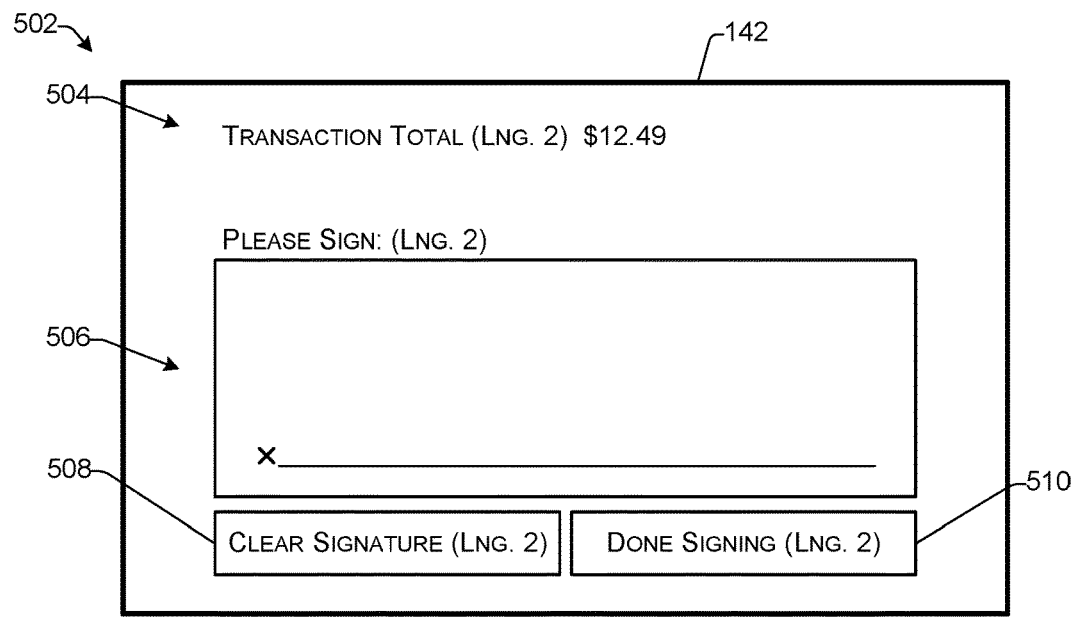
FIGS. 5A and 5B illustrate example interfaces that may be presented to a buyer according to some implementations.
Figure 5B:
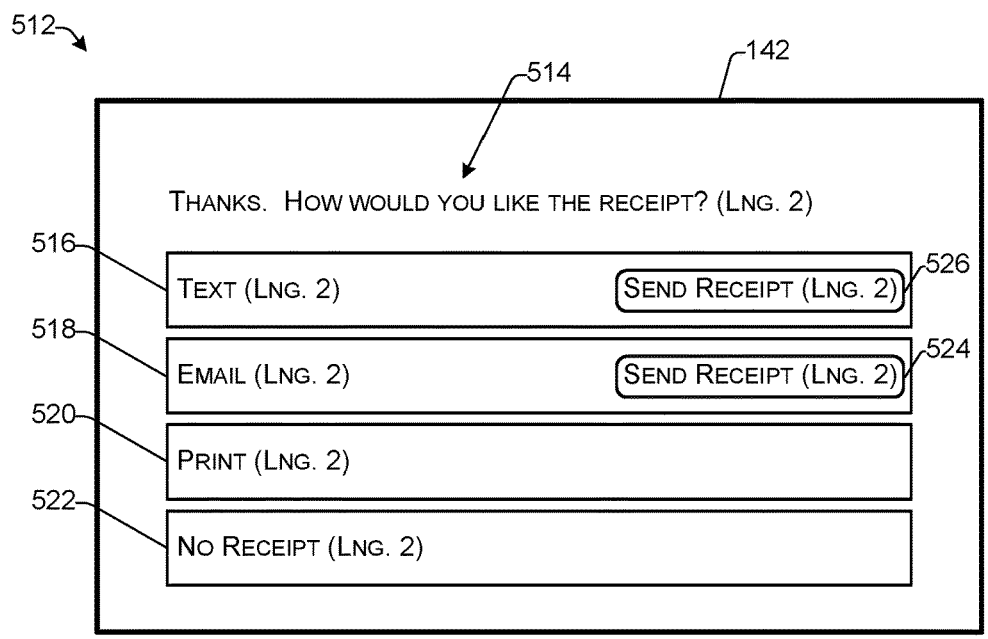

FIGS. 5A and 5B illustrate example UIs that may be presented to the buyer to enable the buyer to complete the buyer stage of the transaction according to some implementations. In the example of FIG. 5A, a buyer UI 502 may be presented on the display 142, and may include a transaction total 504, indicating a total amount to be paid for the transaction; a signature block 506, which may enable the buyer to sign or otherwise authorize the transaction; a "clear signature" virtual control 508, which may enable the buyer to reset the signature block 506; and a "done signing" virtual control 510 which may enable the buyer to accept a signature entered into the signature block 506. Additionally, in some cases, the UI 502 may include other features, such as for enabling the user to enter a tip amount, determine a total with the tip, view a listing of items being purchased and corresponding prices, and so forth.

In some examples, the UI 502 may be presented on the display 142 in the second language, such as prior to repositioning of the display 142 from the first orientation facing in the direction of the merchant to the second orientation facing in the direction of the buyer. In other examples, the UI 502 may be presented initially on the display 142 in the first language associated with the merchant, and in response to determining that the display 142 has been repositioned to the second orientation, the merchant device may then present the UI 502 in the second language. Thus, by changing the orientation of the display 142 from the first orientation to the second orientation the text in the UI may change from the first language to the second language. If the display 142 were to be repositioned back to the first orientation, the text in the UI 502 may be changed back to the first language.

FIG. 5B illustrates another example of a UI 512 that may be presented on the display 142, such as in response to the buyer selecting the done signing virtual control 510. The UI 512 includes an inquiry 514 asking how on the buyer would like to receive a receipt for the transaction. The UI 512 further includes a plurality of virtual controls 516, 518, 520 and 522 that provide the option for the buyer to receive the receipt via e.g., text message, email, printed receipt, or no receipt, respectively. For example, if the buyer has previously provided an email address for receiving a receipt in a past transaction, the email address may be presented in the virtual control 518 and the buyer may select a "send receipt" virtual control 524 to have the receipt sent to the selected email address. Alternatively, if the buyer has not previously provided an email address or if the buyer would like to receive the receipt at a different email address, the buyer may select the virtual control 518 and a virtual keyboard (not shown in FIG. 5B) may be displayed to enable the buyer to enter an email address. Similarly, if the buyer would like to receive the receipt by text message, and the buyer's telephone number, if previously provided, is presented in the virtual control 516, the buyer may select a "send receipt" virtual control 526 to have the receipt sent. As discussed above, while the UI 512 is presented on the display 142, and the display 142 is oriented in the direction of the buyer, the UI 512 may be presented in the second language indicated to be preferred by the buyer.

Figure 6A:
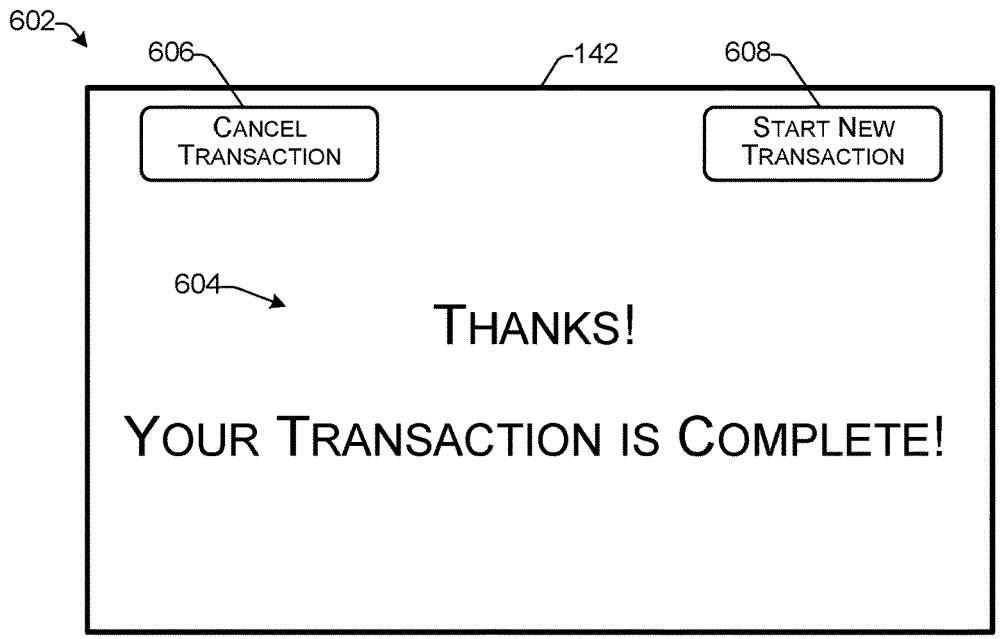
FIGS. 6A and 6B illustrate example interfaces that may be presented to a buyer according to some implementations.
Figure 6B:
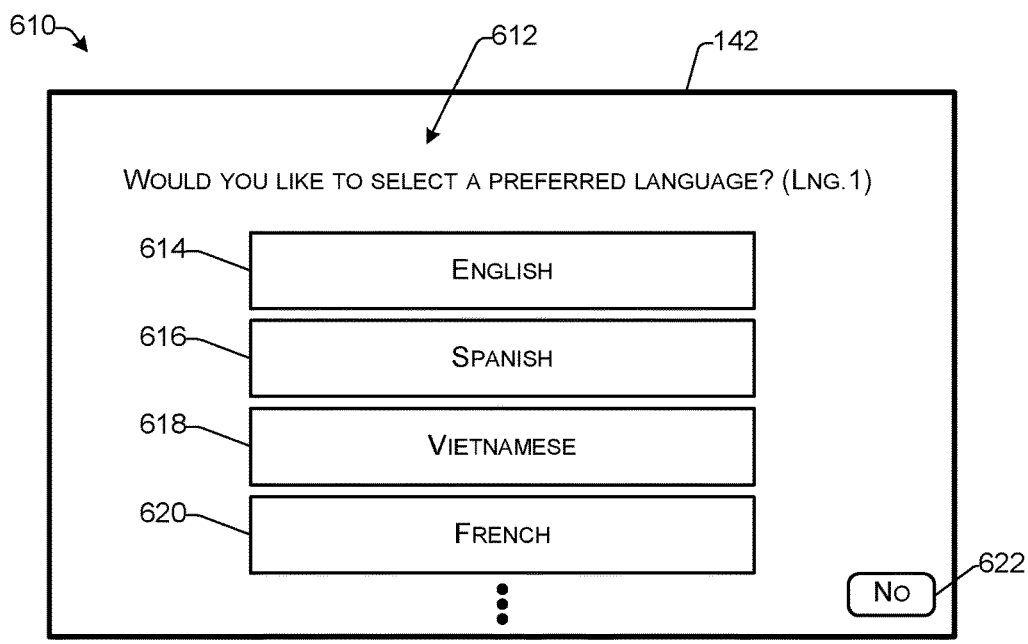

FIGS. 6A and 6B illustrate example UIs that may be presented to the buyer during the buyer stage of the transaction according to some implementations. In the example of FIG. 6A, following the reception selection of a method of receiving and receipt as discussed above, the buyer may be presented with a UI 602 that provides the buyer with a thank you message 604. The thank you message 604 may be presented in the second language indicated to be preferred by the buyer. Additionally, in some examples, one or more virtual controls 606 and 608 may be presented in the UI 602 as well. For example, when the display is reoriented back to facing the merchant, the merchant may use these virtual controls such as for canceling the transaction as indicated by virtual control 606 or start a new transaction as indicated by virtual control 608. As discussed below with respect to FIG. 7, in some examples, based on the current orientation of the display, the virtual control 606 and 608 may be disabled, or may not be presented until after the display has been repositioned back to the first orientation.

FIG. 6B illustrates an example UI 610 that may be presented to the buyer according to some implementations. For example, the UI 610 may be presented by the merchant application 112 in response to receiving language information from the service computing device indicating that a preferred language for the particular buyer has not yet been determined. For instance, as mentioned above, the merchant device may send buyer identification information to the service computing device which attempts to determine a preferred language for the particular buyer participating in the current transaction by referring to a buyer profile for that buyer. If a preferred language not been associated with the buyer profile, the service computing device may send back language information indicating that there is no preferred language associated with the particular buyer. In response to receiving this information, the merchant device may present the UI 610 to the buyer prior to presenting any other UIs to the buyer, such as UIs 502 or 512 discussed above. Additionally, as another example, the UI 610 may be presented to the merchant, and the merchant may ask the buyer if the buyer would like to select a preferred language.

In the illustrated example, the UI 610 includes an inquiry 612 asking the buyer if the buyer would like to select a preferred language. Furthermore, the UI 610 may present a plurality of virtual controls 614-620 that provide various languages that the buyer may select as a preferred language. Furthermore, the buyer may be able to swipe the UI 610 upward to view additional possible selections for preferred languages. Accordingly, the buyer may tap on one of the virtual controls to select a desired preferred language. Furthermore, if the buyer does not desire to select a preferred language, the buyer may tap on or otherwise select a "no" virtual control 622.

If the buyer does select a preferred language, the language module 140 on the merchant device may use this information for determining the appropriate UIs to present to the merchant. Furthermore, the buyer's preferred language may be communicated to the service computing device 108. The service computing device 108 may receive the preferred language and associate the preferred language with the corresponding particular buyer profile.

Figure 7:
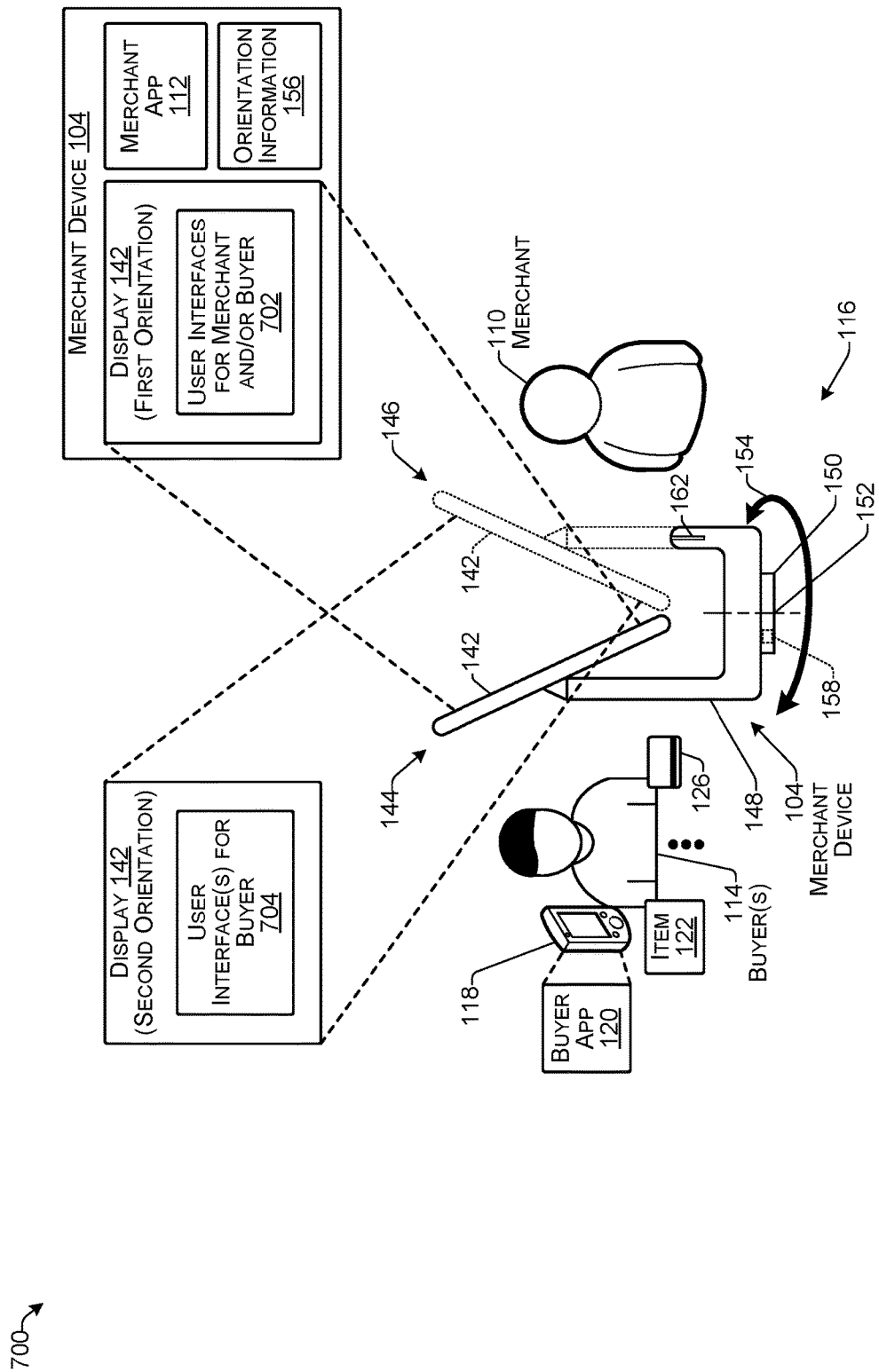
FIG. 7 illustrates an example environment for controlling access to interfaces based on the direction that a display is facing according to some implementations.

FIG. 7 illustrates an example environment 700 in which the orientation of at least the display 142 of the merchant device 104 may be used to control access to certain UIs or other features, such as settings of the merchant application 112 and/or the merchant device 104. In the example UI 602 discussed above with respect to FIG. 6A, following completion of the transaction by the buyer, the virtual control 606 for canceling a transaction and the virtual control 608 for starting a new transaction may be presented on the display 142. For example, in order to provide a speedy transition to the next transaction, it is desirable for the merchant to be able to quickly start a new transaction. However, typically it is not desirable for the buyer to be able to select the virtual control 608 for starting a new transaction, or the virtual control 606 for canceling transaction. For example, it would be undesirable for the buyer to have access to the item selection interface 206 discussed above with respect to FIGS. 2 and 4, and/or other features of the merchant application and/or the merchant device, such as access to device settings, access to application settings, access to communications, access to stored information, and so forth.

Accordingly, in some implementations herein, while the display 142 is oriented facing toward the buyer, the virtual control 606 and the virtual control 608 may be disabled such that if the buyer attempts to select either of these virtual controls, the attempt to select these controls may be ignored by the merchant device 104. When the display 142 is repositioned to facing the merchant direction, the virtual controls 606 and 608 may be enabled, e.g., such that a touch input to the virtual control 606 results in presentation of another UI for canceling a transaction (not shown), and a touch input to the virtual control 608 results in presentation of the UI 206 for entering information for a new transaction. Alternatively, as another example, the virtual controls 606 and 608 may not be presented until the merchant device 104 detects that the display 142 has been repositioned back to the first orientation facing the direction associated with the merchant.

In the example of FIG. 7, when the display 142 is positioned in the first orientation 144, user interfaces 702 for both the merchant and/or buyer may be presented and interacted with on the display 142. In other words, the merchant is presumed to be able to make inputs to the both types of UIs, and may have full access to the UIs and other features accessible on the merchant device. When the display 142 is repositioned to the second orientation 146, user interfaces 704 configured for the buyer only may be presented or interacted with on the display 142, and access is disabled to other UIs, such as those configured to be accessed by the merchant. Accordingly, the merchant application 112 may control the information presented on the display 142 and/or the level of interactivity with the information presented on the display 142 based on the detected orientation of the display 142.

As one example, the merchant device 104 may present the item selection UI 206 discussed above on the display 142 for enabling the merchant to enter information for a transaction, such as to select items that the buyer 114 wants to purchase. When the merchant has completed entry of information related to the transaction, and has, e.g., swiped the payment card 126 of the buyer, the merchant device 104 may present a buyer UI, such as the UIs 502 and/or 512 discussed above with respect to FIGS. 5A and 5B, respectively. For instance, the buyer UIs may include one or more virtual controls configured for the buyer to enter information, make selections, or otherwise perform actions toward completion of the transaction. The buyer 114 may interact with the one or more buyer UI, as discussed above.

When the buyer 114 has completed interaction with the buyer UIs, the merchant device may present the UI 602 discussed above. However, as the display 142 is still facing the buyer direction e.g., is positioned in the second orientation 146, the virtual controls 606 and 608 are either not selectable, or are not presented at all. The display 142 may be reoriented back to the first orientation 144 to face the merchant 110. Based at least in part on the change in orientation of the display 142 from the second orientation 146 back to the first orientation 144, the merchant device 104 may enable initiation of a new transaction by the merchant 110. Accordingly, when the display 142 is accessible to the buyer, only the buyer UIs are presented, and the buyer is unable to interact with or otherwise access the merchant UIs, and is thereby unable to initiate a new transaction, or perform other actions that are properly performed only by the merchant. Subsequently, when the merchant application 112 detects that the display 142 has been returned to the first orientation 144, e.g., facing in the merchant direction, the merchant 110 is able to initiate a new transaction or perform other functions on the merchant device 104 that buyers may be restricted from performing. Furthermore, while the example merchant device configuration of FIG. 7 has been used to discuss this aspect, the other merchant device configurations, such as those discussed above with respect to FIGS. 3A-3C, and/or other merchant device configurations may also be used.

Figure 8:
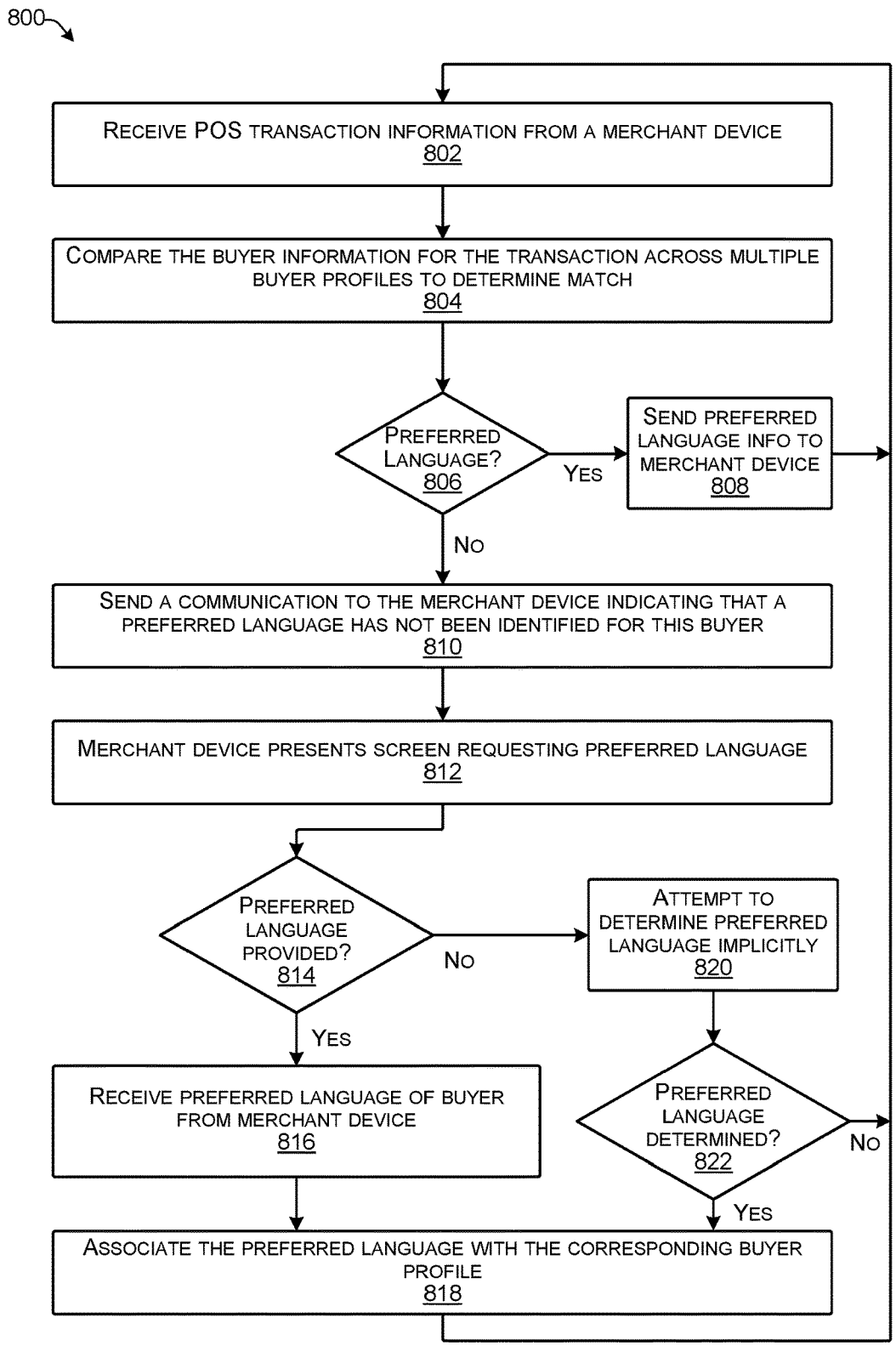
FIG. 8 is a flow diagram illustrating an example process for determining language information and for sending language information to a merchant device according to some implementations.
Figure 9:
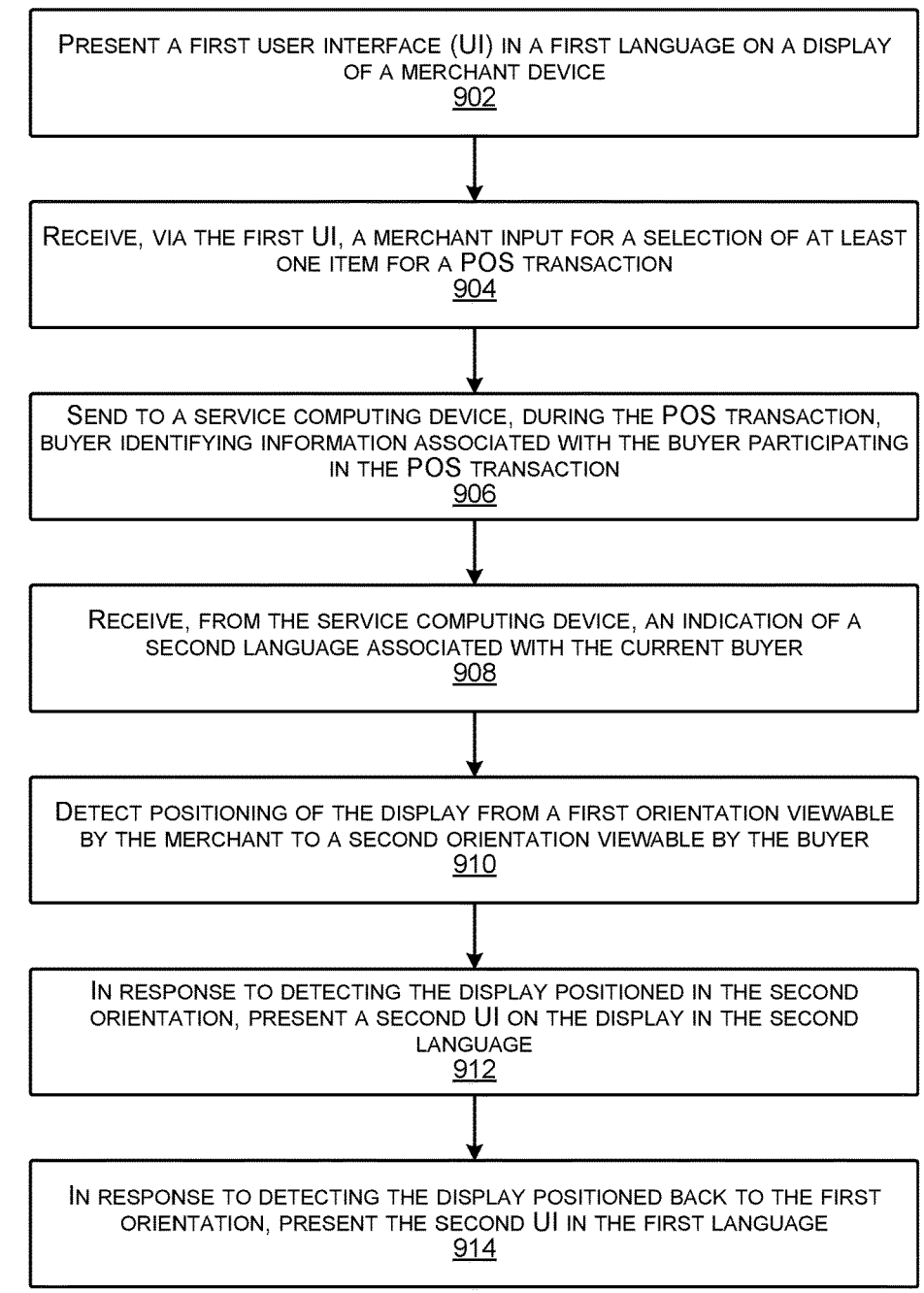
FIG. 9 is a flow diagram illustrating an example process for presenting information in different languages based on display orientation according to some implementations.
Figure 10:
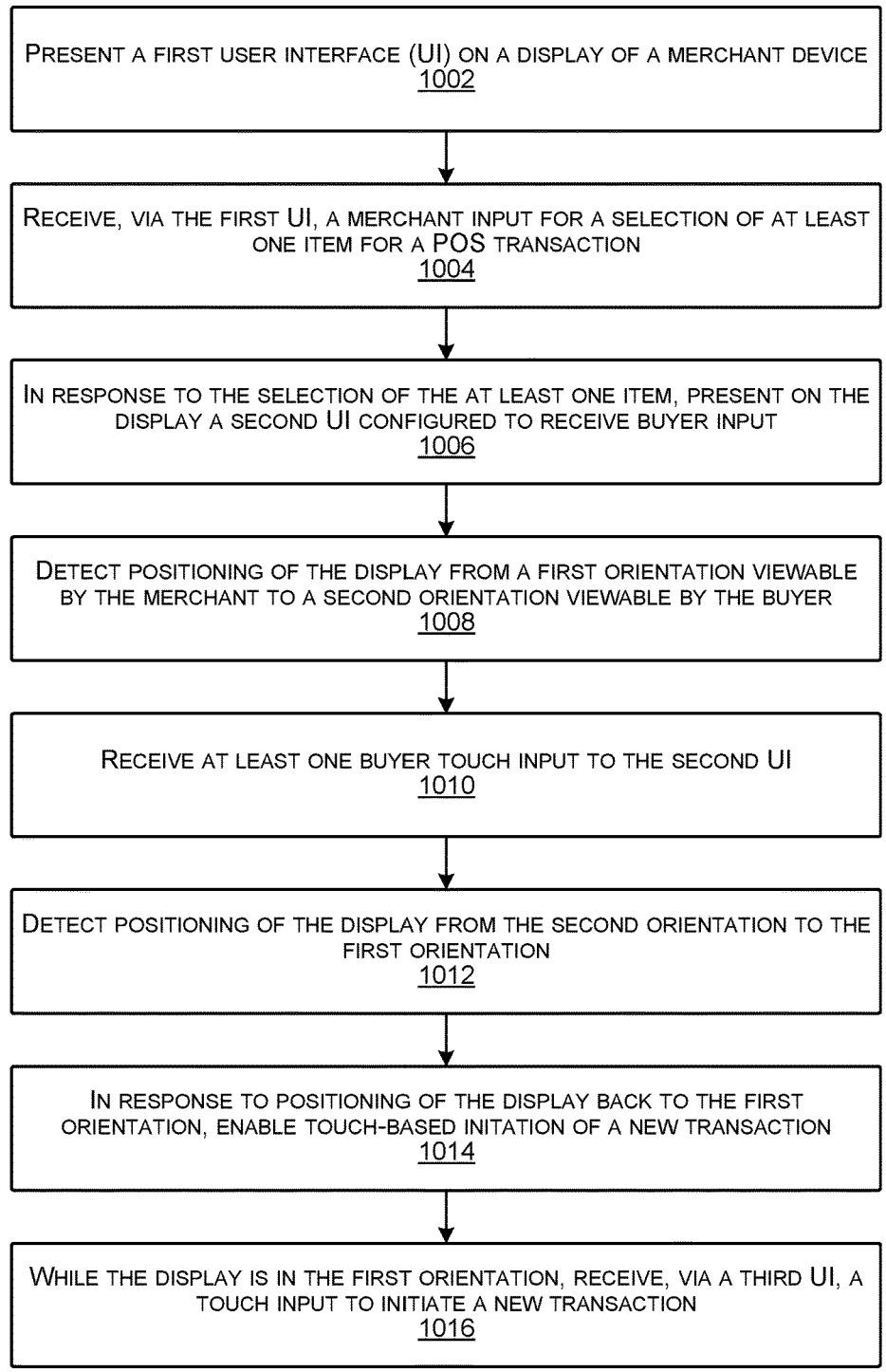
FIG. 10 is a flow diagram illustrating an example process for controlling access to one or more interfaces based on an orientation of a display according to some implementations.

FIGS. 8-10 are flow diagrams illustrating example processes according to some implementations. The processes of FIGS. 8-10 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 8 is a flow diagram of an example process 800 for determining a language to associate with a buyer profile according to some implementations. In some examples, the example process 800 of FIG. 8 may be executed by the service computing device 108, or by other suitable computing devices.

At 802, the computing device may receive POS transaction information from a merchant device associated with a merchant. For example, as discussed above with respect to FIG. 1, the merchant device may send transaction information for a current transaction to the service computing device. The transaction information may include buyer identifying information and item information.

At 804, the computing device may compare the buyer identifying information across multiple buyer profiles to determine a matching buyer profile. For example, the buyer identifying information, such as payment card information, electronic payment account information, a buyer phone number, or other buyer identifying information, may be compared with buyer identifying information contained in a plurality of buyer profiles to locate a particular buyer profile that corresponds to buyer information from the current transaction.

At 806, the computing device may determine whether a preferred language has been associated with the particular buyer profile associated with the buyer participating in the current transaction.

At 808, if a preferred language has been associated with the particular buyer profile, the computing device may send language information to the merchant device that indicates the preferred language of the buyer participating in the current transaction. For example, the language information sent to the merchant device may at least identify the language that has been associated with the particular buyer profile that corresponds to the buyer identifying information obtained for the current transaction.

At 810, on the other hand, if the particular buyer profile does not have a preferred language associated with it, the computing device may send a communication to the merchant device indicating that a preferred language has not been determined for the buyer corresponding to the particular buyer profile.

At 812, in some examples, the language information sent by the computing device may include an instruction that causes the merchant device to present a user interface to the buyer that requests that the buyer indicate a preferred language. For example, as discussed above with respect to FIG. 6B, the merchant device may present, e.g., prior to presenting other buyer interfaces, a user interface that enables the buyer to select a preferred language from a list of potential preferred languages.

At 814, the computing device may determine whether an indication of a preferred language for the particular buyer profile has been received from the merchant device.

At 816, when the buyer selects a preferred language from the buyer interface, the computing device may receive the indication of the preferred language of the buyer from the merchant device.

At 818, the computing device may associate the preferred language with the corresponding particular buyer profile. For example, the computing device may relate (e.g., in the case of a relational database) or otherwise associate the preferred language with the particular buyer profile.

At 820, on the other hand, if the buyer does not provide a preferred language, then the computing device may attempt to determine implicitly a preferred language of the buyer. As one example, if the buyer elects to receive receipts through an email address, when the buyer accesses a receipt using a browser, the language setting of the browser may indicate a preferred language of the buyer. As another example, the buyer profile associated with the buyer may include social network information or other information that may be used to implicitly determine a preferred language of the buyer.

At 822, if a preferred language of the buyer is determined within a threshold confidence level, the process may proceed to block 818 to associate the preferred language with the particular buyer profile. On the other hand, if the preferred language cannot be determined within the threshold confidence level, then a preferred language is not associated with the particular buyer profile.

FIG. 9 is a flow diagram illustrating an example process 900 for presenting information in multiple languages according to some implementations. In some examples, the process 900 may be executed by the merchant device 104, or by another suitable computing device.

At 902, the merchant device may present a first user interface in a first language on a display associated with the merchant device.

At 904, the merchant device may receive, via the first UI, a merchant input for a selection of at least one item for a POS transaction.

At 906, the merchant device may send, to a service computing device, during the POS transaction, buyer identifying information of the buyer participating in the POS transaction. For example, the merchant device may obtain the buyer identifying information from at least one of a payment card presented by the buyer, an electronic payment account associated with the buyer, a merchant incentive program that the buyer participates in, or other buyer identifying information, such as a phone number, email address, or the like, provided by the buyer.

At 908, the merchant device may receive, from the service computing device, an indication of a second language associated with the current buyer. For example, the second language may be different from the first language, and may have been previously associated with the buyer profile corresponding to the buyer currently participating in the POS transaction.

At 910, the merchant device may detect positioning of the display from a first orientation to a second orientation. For example, in the first orientation, the screen of the display may face in the direction associated with the merchant, such that the display may be viewable by the merchant, but not easily viewable by the buyer. In the second orientation, the screen of the display may be positioned to face in a direction that is associated with the buyer, such that the display may be viewable by the buyer. In some examples, the merchant device may include one or more sensors able to detect the orientation of the display. Examples of the sensors may include a switch that is able to detect movement from the first orientation to the second orientation, an accelerometer, a gyroscope, a compass, a proximity sensor, a switch, a camera, a microphone, a biometric sensor, or various other suitable sensors.

At 912, in response to detecting the display has been positioned in the second orientation, the merchant device may present a second UI on the display in the second language. In some examples, the text of the second UI may have been presented on the display in the first language prior to movement of the display to the second orientation, which results in the text of the UI being presented in the second language. In other examples, the second UI may not be presented on the display until after the display is moved to the second orientation.

At 914, in response to detecting the display has been positioned back to the first orientation, the merchant device may present at least one of the second UI or a third UI in the first language. Accordingly, the display may be flipped or otherwise repositioned between a first orientation and a second orientation such that in the first orientation information is presented in the first language and in the second orientation, information is presented in the second language during the transaction with the particular buyer. When a subsequent transaction is conducted with a next buyer, a third language preferred by the next buyer, which may be different from the second language or the first language, may be used to present the information on the display when the display is in the second orientation.

FIG. 10 is a flow diagram illustrating an example process 1000 for controlling access based on display orientation according to some implementations. In some examples, the process may be executed by the merchant device or by another suitable computing device.

At 1002, the merchant device may present a first UI on a display of a merchant device. For example, the first UI may enable the merchant to select one or more items that the buyer desires to purchase from the merchant.

At 1004, the merchant device may receive, via the first UI, a merchant input for selection of at least one item for a POS transaction during a merchant stage of the POS transaction.

At 1006, based at least in part on the selection of the at least one item, the merchant device may present, on the display, a second UI configured to receive at least one buyer input. For example, following entry of the item selection information by the merchant, the merchant may swipe the payment card or may otherwise receive a payment instrument from the buyer. In response, the merchant device may present a buyer UI configured to receive buyer interaction to enable the buyer to complete the buyer stage of the transaction.

At 1008, the merchant device may detect that the display has been positioned from a first orientation to a second orientation. For example, in the first orientation, the display may face in the direction associated with the merchant such that the display may be viewable by the merchant, but not easily viewable by the buyer. In the second orientation, the display may be positioned to face in a direction that is associated with the buyer, such that the display may be viewable by the buyer. In some examples, the merchant device may include one or more sensors able to detect the orientation of the display. Examples of the sensors may include a switch that is able to detect movement from the first orientation to the second orientation, the accelerometer, gyroscope, a compass, a proximity sensor, a switch, a camera, a microphone, a biometric sensor, or various other suitable sensors. Furthermore, in some examples, the second UI may be presented on the display before the display is positioned in the second orientation, while in other examples, the second UI may be presented on the display in response to detecting that the display has been positioned in the second orientation.

At 1010, the merchant device may receive at least one buyer touch input to the second UI. For example, the buyer may provide a signature, may provide input for how to receive a receipt, may provide input to agree to payment of an amount of the transaction, may enter an amount for a gratuity, or may provide various other inputs during a buyer stage of the POS transaction.

At 1012, the merchant device may detect positioning of the display from the second orientation back to the first orientation. As discussed above, one or more sensors may provide orientation information to the merchant device to enable the merchant device to determine that the display is in the first orientation e.g., facing a direction associated with the merchant.

At 1014, in response to determining that the display has been positioned back to the first orientation, the merchant device may enable touch-based initiation of a new transaction. For example, while the display is positioned in the second orientation, initiation of a new transaction may be prevented or otherwise disabled so as to prevent the buyer from initiating a new transaction and/or from initiating cancellation of the current transaction. As one example, virtual controls for initiating a new transaction and/or for canceling the current transaction may be disabled so long as the display is positioned in the second orientation. As another example, the virtual controls for initiating a new transaction and for canceling the current transaction may not be presented on the display until the merchant device determines that the display has been moved back to the first orientation.

At 1016, while the display is positioned in the first orientation, the merchant device may receive, via a third UI, a touch input to initiate a new transaction. For example, the third UI may comprise the virtual control for initiating a new transaction that is in disabled when the display is in the second orientation, but which is enabled when the display is positioned in the first orientation. Alternatively, as mentioned above, in some examples, the third UI may not be presented until the merchant device has determined that the display is in the first orientation. In either alternative, in response to receiving the touch input to initiate the new transaction, the merchant device may present the first UI on the display to enable the merchant to enter item information for the new transaction. As another example, upon detecting that the display has been reoriented to the first orientation, the merchant application may automatically present the first UI, e.g., UI 206, to enable the merchant to begin entering information for a new transaction.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 11:
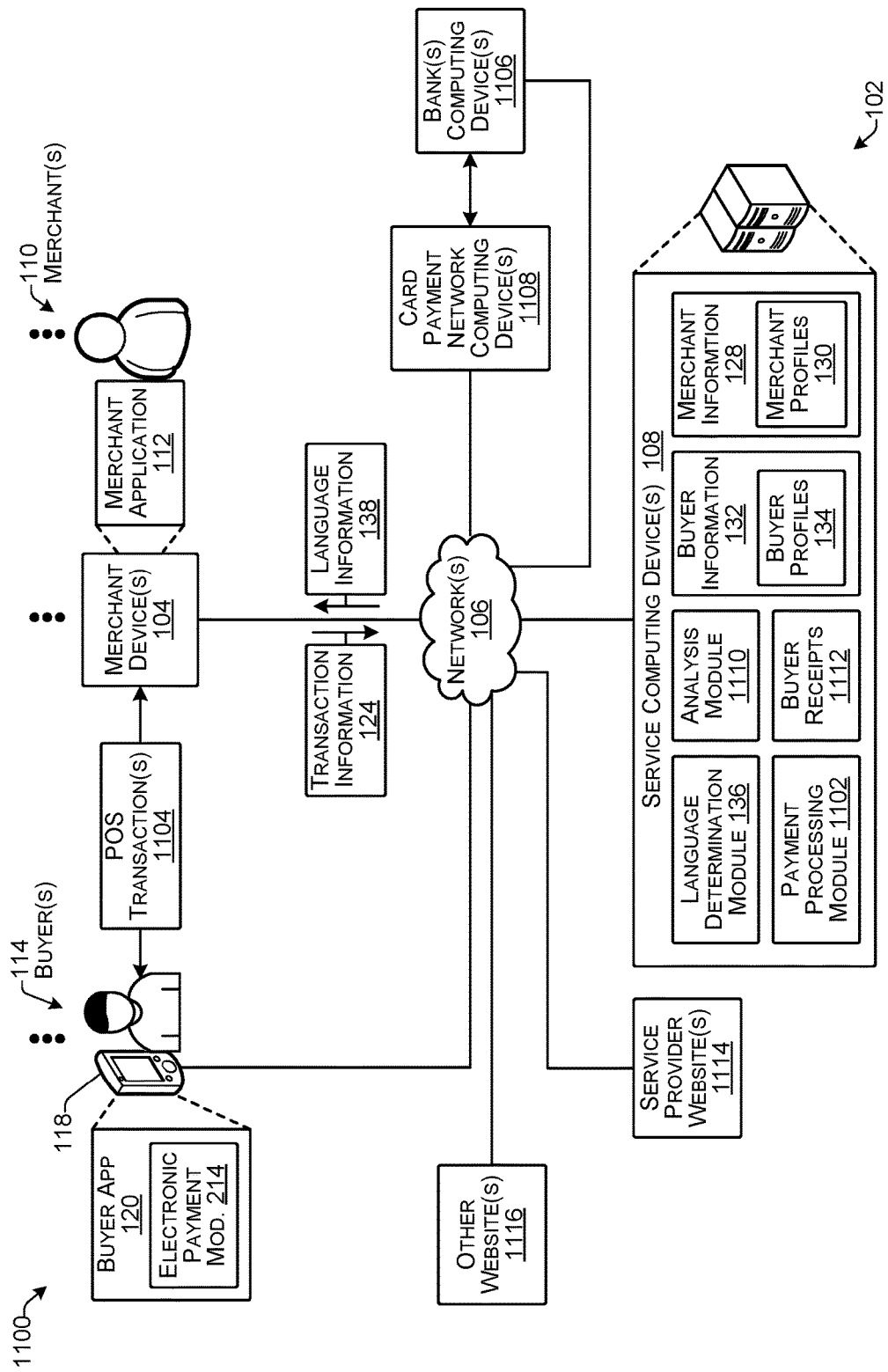
FIG. 11 illustrates an example architecture of a system for providing a payment service with multilingual capability according to some implementations.

FIG. 11 illustrates an example architecture of a payment and language information system 1100 able to provide a payment and language information service according to some implementations. In the example of FIG. 11, the service computing device 108 of the service provider 102 includes a payment processing module 1102, which may be executed to provide the payment and transaction functionality. The payment processing module 1102 may receive at least transaction information 124 for processing payments made through the buyer application 120 and/or the merchant application 112. For example, the payment processing module 1102 may receive transaction information 124, such as an amount of a POS transaction 1104, and may verify that the linked payment card can be used to pay for the transaction, such as by contacting a card clearinghouse computing device or other bank computing device, as discussed additionally below. Furthermore, in some examples, the payment processing module 1102 may redirect payment information for transactions to be made using a payment card to a bank computing device 1106, while in other examples, the merchant devices 104 may communicate directly with an appropriate bank computing device 1106 or card payment network computing device 1108 for approving or denying a transaction using a particular payment card for a particular POS transaction 1104. The payment processing module 1102 and corresponding payment functionality may be implemented as one or more computer programs, or other executable instructions, on the service computing device 108 in one or more locations, such as for providing the payment systems, components, and techniques described herein.

The example of FIG. 11 illustrates that one or more buyers 114 may have one or more respective buyer devices 118 in some examples, which are able to communicate with at least one merchant device 104 and/or the service computing device 108 over the one or more networks 106. The buyer device 118 may include the buyer application 120, as previously discussed herein, which may include an electronic payment 214 that provides functionality for enabling the buyer 114 to make electronic payments using the buyer device 118. In some examples, the buyer application 120 may include various other applications or modules, such as for a buyer dashboard to enable the buyer to control information in the buyer's profile, set buyer preferences, and so forth.

Further, the merchant device 104 may be associated with a merchant 110 that participates in the payment service provided by the service provider 102, and the merchant device 104 may include the merchant application 112. As discussed elsewhere herein, the buyer device 118 and the merchant device 104 can each be a computing device able to communicate with each other, with the service computing device 108, and with various other computing devices, through any suitable communication protocols, interfaces, and networks, including the one or more communication networks 106.

The buyer device 118 and the merchant device 104 can each include one or more components, e.g., software or hardware, that are configured to respectively determine a geographic location of the buyer device 118 and/or the merchant device 104, using, for example, various geolocation techniques, e.g., a global positioning system (GPS), cell tower location, wireless access point location, wireless beacon location, and so forth. Further, the buyer device 118 and the merchant device 104 can each be any appropriate device operable to send and receive requests, messages, or other types of information over the one or more networks 106 or directly to each other. Some examples of buyer devices 118 and merchant devices 104 are enumerated below. Additionally, while only a single buyer device 118 and a single merchant device 104 are illustrated in the example of FIG. 11, in some implementations, there may be thousands, hundreds of thousands, or more, of the buyer devices 118 and the merchant devices 104.

The one or more networks 106 can include any appropriate network, including a wide area network, such as the Internet; a local area network, such an intranet; a wireless network, such as a cellular network, a local wireless network, such as Wi-Fi and/or close-range wireless communications, such as Bluetooth® and Bluetooth® low energy; a wired network; or any other such network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 108, the merchant devices 104, the buyer devices 118, and the other computing devices discussed herein are able to communicate over the one or more networks 106 using wired or wireless connections, and combinations thereof.

Additionally, in some examples, transaction information may also be obtained with respect to buyers 114 that do not have a buyer device 118, the buyer application 120, and/or an account with the payment service provided through the service computing device 108. The transaction information collected with respect to these buyers 114 may be sent to the service computing device 108, and buyer profiles may be created for the buyers 114. Should one or more of these buyers later sign up for the electronic payment service, the transaction information of an existing buyer profile for that buyer may be merged with the newly created profile.

In some implementations, the payment service enables card-less payments, e.g., electronic payments, for transactions between the buyers 114 and the merchants 110 based on interaction of the buyer 114 with the buyer application 120 and interaction of the merchant 110 with the merchant application 112. Accordingly, in some examples, a card-less payment transaction may include a transaction conducted between a buyer 114 and a merchant 110 at a POS location during which an electronic payment account of the buyer 114 is charged without the buyer 114 having to physically present a payment card to the merchant 110 at the POS location. Consequently, the merchant 110 need not receive any details about the financial account of the buyer 114 for the transaction to be processed. As one example, the electronic payment may be charged to a credit card issuer or credit card number that the buyer 114 provided when signing up with the service provider for the electronic payment account. As another example, the buyer 114 may have a quantity of money pre-paid in an account maintained for use in making the electronic payments. Other variations will also be apparent to those of skill in the art having the benefit of the disclosure herein.

Before conducting an electronic payment transaction, the buyer 114 typically creates a user account with service provider of the payment service. The buyer 114 can create the user account, for example, by interacting with the buyer application 120 that is configured to perform electronic payment transactions and that may execute on the buyer device 118. When creating a buyer electronic payment account with the payment service, the buyer 114 may provide an image including the face of the buyer, data describing a financial account of the buyer 114, e.g., a credit card number, expiration date, and a billing address. This user information can be securely stored by the payment service, such as in a secure database. Further, the buyer profiles 134 may be created for each buyer 114, which may include information about the buyer and transactions conducted by the buyer.

The service computing device 108 may further include an analysis module 1110. For example, the analysis module 1110 may receive the transaction information 124 and associate the transaction information 124 with appropriate merchant profiles 130 and appropriate buyer profiles 134. Thus, the analysis module 1110 may compare received transaction information 124, such as an identifier of the merchant device 104 or an identifier of an instance of a merchant application 112 from which the transaction information 124 is received for associating the transaction information 124 with a particular merchant profile 130. Furthermore, the analysis module 1110 may extract buyer information such as a credit card identifier, buyer name, buyer email address, and various other pieces of buyer identifying information from the transaction information 124, and may match this information with an existing buyer profile 134 or, if no match is found, then a new buyer profile 134 may be created.

The buyer profiles 134 and/or merchant profiles 130 described herein may be created and maintained using any suitable types of data structures, and using any suitable data storage or database techniques. In some examples, the transaction information and other profile information may be maintained in a relational database in which pieces of information for individual buyer profiles may be stored distinctly from one another, but are related to or otherwise associated with each other in the relational database. For instance, a particular buyer profile 134 may be obtained by generating a view of a portion the data related in the database to the particular buyer profile, or by otherwise extracting the data from the database. Alternatively, of course, other types of storage techniques may be used for generating and maintaining the buyer profiles 134 and/or the merchant profiles 130. Furthermore, in some examples a probabilistic model may be used to determine within a threshold level of confidence that transaction information 124 from a particular transaction should be associated with a particular buyer profile 134. The analysis module 1110 may be configured to harmonize the transaction information that is received from various merchant devices so that orphan or otherwise disconnected sets of transaction information that correspond to different financial payment accounts, e.g., different payment cards or electronic payment accounts, etc., can be matched to or otherwise associated with particular buyer profiles. The analysis module 1110 can generate the probabilistic model, for example, by utilizing one or more of a weighted graph model, a probabilistic data store and/or a trained statistical model.

To accept be able to electronic payments for POS transactions 1104, the merchant 110 typically creates a merchant account with the payment service by providing information describing the merchant including, for example, a merchant name, contact information, e.g., telephone numbers, the merchant's geographic location address, and one or more financial accounts to which funds collected from buyers will be deposited. This merchant information can be securely stored by the payment service, for example, in the merchant information 128, such as in a secure database. Further, a merchant profile 130 may be created for each merchant, which may include information about the merchant and transactions conducted by the merchant.

The payment service can include one or more servers that are configured to perform securely electronic financial transactions, e.g., electronic payments for transactions between a buyer and a merchant, for example, through data communicated between the buyer device 118 and the merchant device 104. Generally, when a buyer and a merchant enter into an electronic payment transaction, the transaction is processed by electronically transferring funds from a financial account associated with the buyer account to a financial account associated with the merchant account.

Determining whether the buyer device 118 is within a threshold geographic distance of the merchant device 104 can be accomplished in different ways including, for example, determining whether the buyer device 118 is within a threshold geographic radius of the merchant device 104, determining whether the buyer device 118 is within a particular geofence, or determining whether the buyer device 118 can communicate with the merchant device 104 using a specified wireless technology, e.g., Bluetooth® or Bluetooth® low energy (BLE). In some examples, the payment service restricts electronic payment transactions between the buyer 114 and the merchant 110 to situations where the geographic location of the buyer device 118 is within a threshold geographic distance from a geographic location of the merchant device 104.

The payment service can also be configured to communicate with the one or more computing devices 1008 of a card payment network (e.g., MasterCard®, VISA®) over the one or more networks 106 to conduct financial transactions electronically. The payment service can also communicate with one or more bank computing devices 1106 of one or more banks over the one or more networks 106. For example, the payment service may communicate with an acquiring bank, and/or an issuing bank, and/or a bank maintaining buyer accounts for electronic payments.

The buyer 114 operating the buyer device 118 that is within a threshold geographic distance of the merchant device 104 can interact with the buyer application 120 executed on the buyer device 118 to conduct an electronic payment transaction with the merchant 110. While interacting with the buyer application 120, the buyer 114 can select the merchant 110, from a listing of merchants 110, with whom the buyer 114 wants to enter into an electronic payment transaction. The buyer 114 can select the merchant 110, for example, by selecting a "check in" option associated with the merchant 110. The buyer device 118 can communicate data to the payment service indicating that the buyer 114 has checked in with the merchant 110. In response, the payment service can communicate data to notify the merchant device 104 that the buyer has checked in. The merchant application 112 executing on the merchant device 104 can notify the merchant 110 that the buyer has electronically checked in with the merchant 110 through a display screen of the merchant device 104.

After checking in, the buyer 114 can obtain, or request, items that are available to be acquired from the merchant 110. When the buyer 114 is ready to enter into the card-less payment transaction, the buyer 114 can, for example, approach a point of sale for the merchant 110 and identify him or herself. For example, the buyer 114 can verbally notify the merchant 110 that the buyer 114 wants to enter into a card-less payment transaction and can provide the merchant 110 with the buyer's name. The merchant 110 can then interact with the merchant application 112 to select the buyer 114, from a listing of buyers that have checked in with the merchant 110, to initiate an electronic payment transaction for the item(s) being acquired by the buyer 114.

The payment service can then communicate with the computing device 1108 of a card payment network to complete an electronic payment transaction for the total amount to be charged to the buyer's electronic payment account. When the electronic payment transaction is complete, the payment service can communicate data describing the electronic payment for the transaction to the buyer device 118, e.g., as an electronic receipt 1112, which can, for example, notify the buyer 114 of the total amount charged to the buyer for the electronic payment for the transaction with the particular merchant. At least a portion of a receipt 1112, such as an image accessible through an image tag, may be stored by the service computing device 108. As discussed above, the service computing device 108 may detect a language associated with a buyer browser that accesses the receipts 1112, such as for determining implicitly a language preferred by the particular buyer. Further, while a mobile buyer device 118 is described in this example for purposes of explanation, additional or alternative types of devices may be used in other examples.

In addition, in some examples, the service provider 102 may make available one or more service provider websites 1114 that enable merchants 110 to advertise items on the service provider website(s). For example, merchants 110 may offer 114 on the website. The buyers may purchase the items using a web browser, or other application on a computing device, such as the buyer device 118 or other computing device. The transaction information from these transactions may be provided to the service computing device 108 to add further to the transaction information in the buyer profiles 134 and the merchant profiles 130.

In addition, the analysis module 1110 and/or the language determination module 136 may access other websites 1116 when determining information about buyers, respectively. For example, demographic information and other buyer information may be obtained from the US Census Bureau website, social network sites, a microblog site, or other online presences of the various different buyers. Similarly, geographic information may be obtained from websites that provide maps and other geographic or demographic information, or the like.

Figure 12:
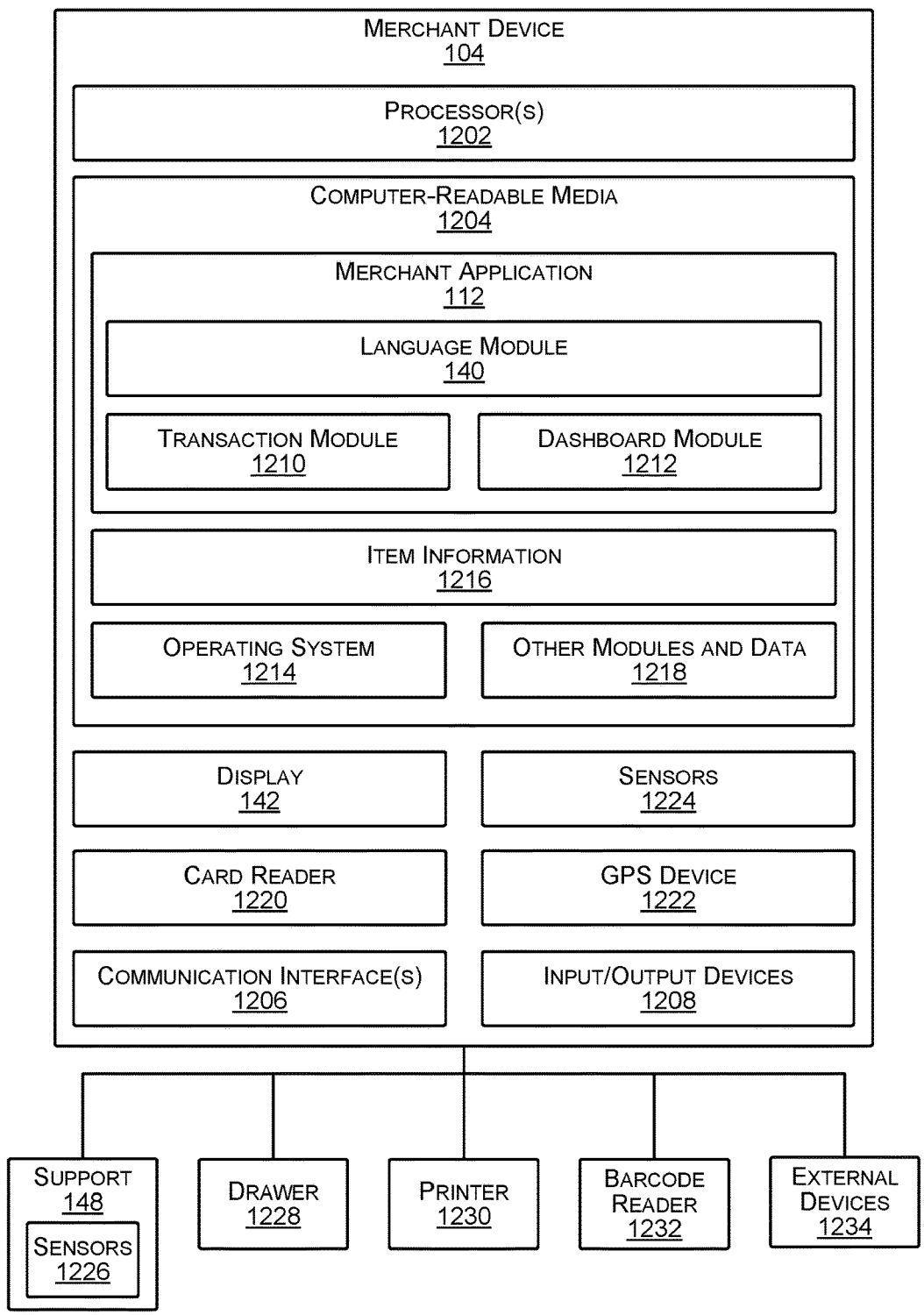
FIG. 12 illustrates select components of an example merchant device according to some implementations.

FIG. 12 illustrates select example components of an example merchant device 104 according to some implementations. The merchant device 104 may be any suitable type of computing device, e.g., portable, semi-portable, semi-stationary, or stationary. Some examples of the merchant device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 includes at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the merchant device 104, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the merchant device 104 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the merchant device 104. Functional components of the merchant device 104 stored in the computer-readable media 1204 may include the merchant application 112. In this example, the merchant application 112 includes the language module 140, discussed above, a transaction module 1210 and a dashboard module 1212. For example, the transaction module 1210 may present various user interfaces, as discussed above, to enable the merchant to conduct transactions, receive payments, and so forth, as well as for communicating with the service computing device 108 for processing payments and sending transaction information. Further, the dashboard module 1212 may enable the merchant to manage the merchant's account, the merchant profile, merchant preferences, view item pricing information, and the like. Additional functional components may include an operating system 1214 for controlling and managing various functions of the merchant device 104 and for enabling basic user interactions with the merchant device 104.

In addition, the computer-readable media 1204 may also store data, data structures and the like, that are used by the functional components. For example, data stored by the computer-readable media 1204 may include item information 1216 that includes information about the items offered by the merchant, which may include a list of items currently available from the merchant, images of the items, descriptions of the items, prices of the items, and so forth. For instance, when the merchant 110 is setting up the merchant application 112 to accept payments for particular items offered by the merchant 110, the merchant may enter the item information 1216 for the particular items. Depending on the type of the merchant device 104, the computer-readable media 1204 may also optionally include other functional components and data, such as other modules and data 1218, which may include programs, drivers, etc., and the data used or generated by the functional components. Further, the merchant device 104 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the merchant device 104 may include the display 142 mentioned above. Depending on the type of computing device used as the merchant device 104, the display 142 may employ any suitable display technology. For example, the display 142 may be a liquid crystal display, a plasma display, a light emitting diode display, an OLED (organic light-emitting diode) display, an electronic paper display, or any other suitable type of display able to present digital content thereon. In some examples, the display 142 may have a touch sensor associated with the display 142 to provide a touchscreen display configured to receive touch inputs for enabling interaction with a graphic interface presented on the display 142. Accordingly, implementations herein are not limited to any particular display technology. Alternatively, in some examples, the merchant device 104 may not include the display 142, and information may be presented by other means, such as aurally.

The merchant device 104 may further include the one or more I/O devices 1208. The I/O devices 1208 may include speakers, a microphone, a camera, and various user controls (e.g., buttons, a joystick, a keyboard, a keypad, etc.), a haptic output device, and so forth.

In addition, the merchant device 104 may include or may be connectable to a card reader 1220. In some examples, the card reader may plug in to a port in the merchant device, such as a microphone/headphone port, a data port, or other suitable port. The card reader may include a read head for reading a magnetic strip of a payment card, and further may include encryption technology for encrypting the information read from the magnetic strip. Alternatively, numerous other types of card readers may be employed with the merchant devices 104 herein, depending on the type and configuration of the merchant device 104.

Other components included in the merchant device 104 may include various types of sensors, which may include a GPS device 1222 able to indicate location information. Further, the merchant device may include one or more sensors 1224, such as an accelerometer, gyroscope, compass, proximity sensor, camera, microphone, and/or a switch, as discussed above. Additionally, the merchant device 104 may include various other components that are not shown, examples of which include removable storage, a power source, such as a battery and power control unit, and so forth.

In addition, the merchant device 104 may include various external components or peripherals such as the support 148 or the other supports discussed herein. As mentioned above, in some examples the support may include one or more sensors 1226 such as a switch, an accelerometer, a compass, a gyroscope, a proximity sensor, a camera, a microphone, or other suitable sensors for determining the orientation of the merchant device. Furthermore, in some examples of the merchant device 104 may include a cash drawer 1228, a printer 1230, such as for printing receipts, and/or a barcode reader 1232 for scanning items to be purchased. Furthermore, the merchant device 104 may be connected to, or able to connect to, various external devices 1234 such as other computing devices and or external storage devices.

Figure 13:
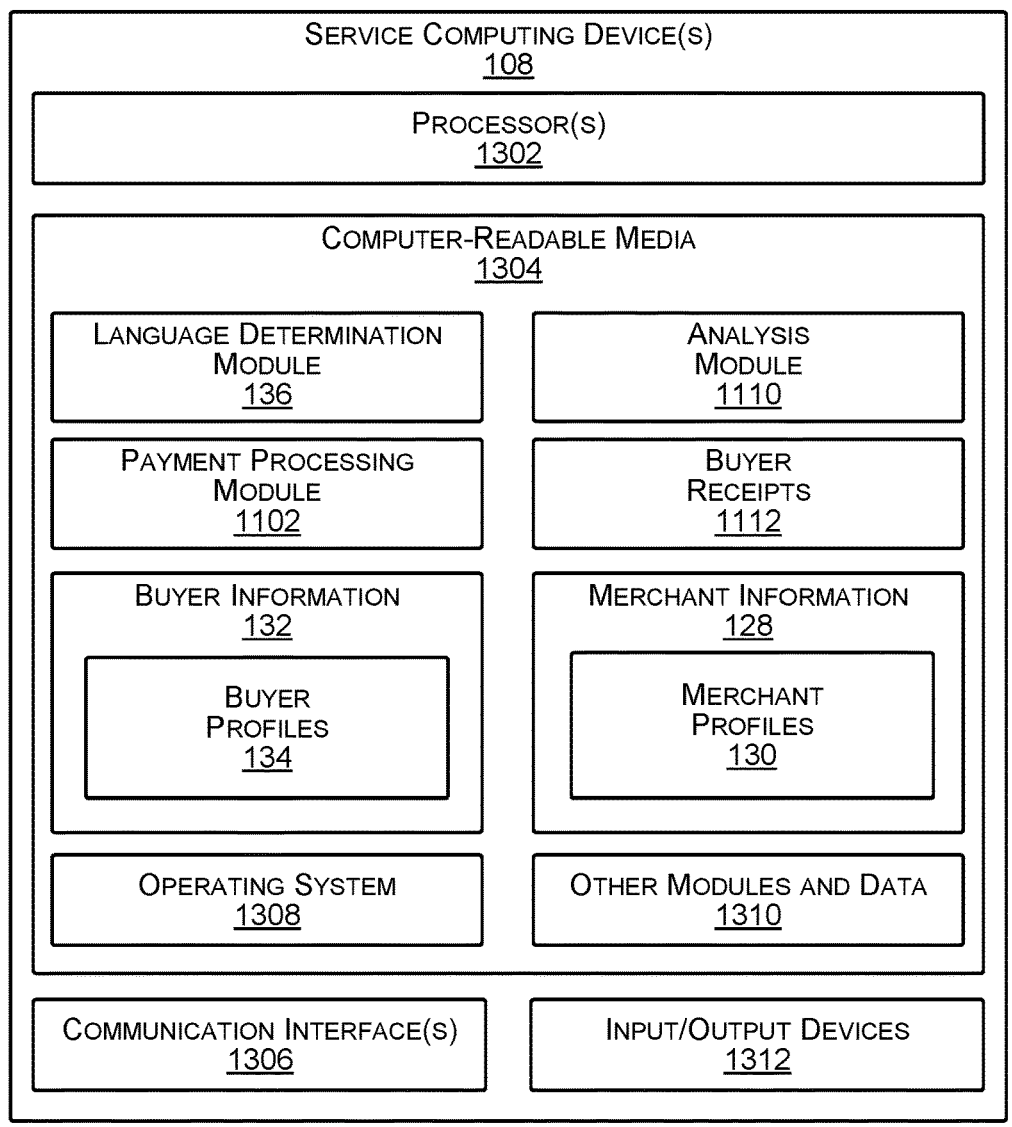
FIG. 13 illustrates select components of one or more example service computing devices according to some implementations.

FIG. 13 illustrates select components of the service computing device 108 that may be used to implement some functionality of the payment service described herein. The service computing device 108 may be operated by a service provider that provides the payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 108 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 108 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 108 may include one or more processors 1302, one or more computer-readable media 1304, and one or more communication interfaces 1306. Each processor 1302 may be a single processing unit or a number of processing units, and may include single or multiple computing units or multiple processing cores. The processor(s) 1302 can be implemented as one or more microprocessors, microcomputers, microcontrollers, digital signal processors, central processing units, state machines, logic circuitries, and/or any devices that manipulate signals based on operational instructions. For instance, the processor(s) 1302 may be one or more hardware processors and/or logic circuits of any suitable type specifically programmed or configured to execute the algorithms and processes described herein. The processor(s) 1302 can be configured to fetch and execute computer-readable instructions stored in the computer-readable media 1304, which can program the processor(s) 1302 to perform the functions described herein.

The computer-readable media 1304 may include volatile and nonvolatile memory and/or removable and non-removable media implemented in any type of technology for storage of information, such as computer-readable instructions, data structures, program modules, or other data. Such computer-readable media 1304 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 108, the computer-readable media 1304 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1304 may be used to store any number of functional components that are executable by the processors 1302. In many implementations, these functional components comprise instructions or programs that are executable by the processors 1302 and that, when executed, specifically configure the one or more processors 1302 to perform the actions attributed above to the service computing device 108. Functional components stored in the computer-readable media 1304 may include the language determination module 136, the analysis module 1110, and the payment processing module 1102. Additional functional components stored in the computer-readable media 1304 may include an operating system 1308 for controlling and managing various functions of the service computing device 108.

In addition, the computer-readable media 1304 may store data used for performing the operations described herein. Thus, the computer-readable media may store the merchant information 128, including the merchant profiles 130, and the buyer information 132, including the buyer profiles 134. The service computing device 108 may also include or maintain other functional components and data, such as other modules and data 1310, which may include programs, drivers, etc., and the data used or generated by the functional components. Further, the service computing device 108 may include many other logical, programmatic and physical components, of which those described above are merely examples that are related to the discussion herein.

The communication interface(s) 1306 may include one or more interfaces and hardware components for enabling communication with various other devices, such as over the network(s) 106. For example, communication interface(s) 1306 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 108 may further be equipped with various input/output (I/O) devices 1312. Such I/O devices 1312 may include a display, various user interface controls (e.g., buttons, joystick, keyboard, mouse, touch screen, etc.), audio speakers, connection ports and so forth.

Figure 14:
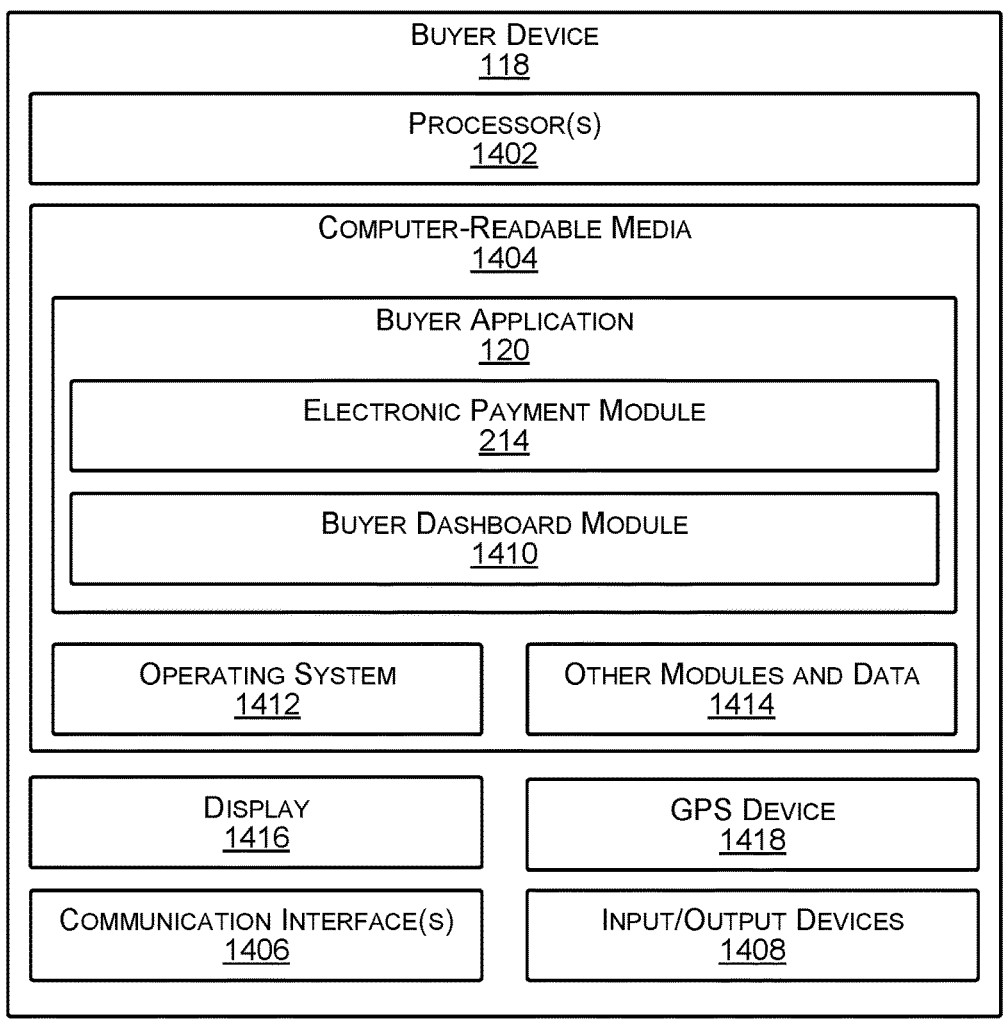
FIG. 14 illustrates select components of an example buyer device according to some implementations.

FIG. 14 illustrates select example components of the buyer device 118 that may implement the functionality described above according to some examples. The buyer device 118 may be any of a number of different types of portable computing devices. Some examples of the buyer device 118 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 14, the buyer device 118 includes components such as at least one processor 1402, one or more computer-readable media 1404, the one or more communication interfaces 1406, and one or more input/output (I/O) devices 1414. Each processor 1402 may itself comprise one or more processors or processing cores. For example, the processor 1402 can be implemented as one or more microprocessors, microcomputers, microcontrollers, digital signal processors, central processing units, state machines, logic circuitries, and/or any devices that manipulate signals based on operational instructions. In some cases, the processor 1402 may be one or more hardware processors and/or logic circuits of any suitable type specifically programmed or configured to execute the algorithms and processes described herein. The processor 1402 can be configured to fetch and execute computer-readable processor-executable instructions stored in the computer-readable media 1404.

Depending on the configuration of the buyer device 118, the computer-readable media 1404 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1404 may include, but is not limited to, RAM, ROM, EEPROM, flash memory, solid-state storage, magnetic disk storage, optical storage, and/or other computer-readable media technology. Further, in some cases, the buyer device 118 may access external storage, such as RAID storage systems, storage arrays, network attached storage, storage area networks, cloud storage, or any other medium that can be used to store information and that can be accessed by the processor 1402 directly or through another computing device or network. Accordingly, the computer-readable media 1404 may be computer storage media able to store instructions, modules or components that may be executed by the processor 1402. Further, when mentioned, non-transitory computer-readable media exclude media such as energy, carrier signals, electromagnetic waves, and signals per se.

The computer-readable media 1404 may be used to store and maintain any number of functional components that are executable by the processor 1402. In some implementations, these functional components comprise instructions or programs that are executable by the processor 1402 and that, when executed, implement operational logic for performing the actions and services attributed above to the buyer device 118. Functional components of the buyer device 118 stored in the computer-readable media 1404 may include the buyer application 120, as discussed above. In this example, the buyer application 120 includes the electronic payment module 214, as discussed above, and a buyer dashboard module 1410. For example, the buyer dashboard module 1410 may present the buyer with an interface for managing the buyer's account, changing information, changing preferences, and so forth. Additional functional components may include an operating system 1412 for controlling and managing various functions of the buyer device 118 and for enabling basic user interactions with the buyer device 118.

In addition, the computer-readable media 1404 may also store data, data structures and the like, that are used by the functional components. Depending on the type of the buyer device 118, the computer-readable media 1404 may also optionally include other functional components and data, such as other modules and data 1406, which may include applications, programs, drivers, etc., and the data used or generated by the functional components. Further, the buyer device 118 may include many other logical, programmatic and physical components, of which those described are merely examples that are related to the discussion herein.

The communication interface(s) 1406 may include one or more interfaces and hardware components for enabling communication with various other devices, such as over the network(s) 106 or directly. For example, communication interface(s) 1406 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 14 further illustrates that the buyer device 118 may include a display 1416. Depending on the type of computing device used as the buyer device 118, the display may employ any suitable display technology. For example, the display 1416 may be a liquid crystal display, a plasma display, a light emitting diode display, an OLED (organic light-emitting diode) display, an electronic paper display, or any other suitable type of display able to present digital content thereon. In some examples, the display 1416 may have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the buyer device 118 may not include a display.

The buyer device 118 may further include the one or more I/O devices 1408. The I/O devices 1408 may include speakers, a microphone, a camera, and various user controls (e.g., buttons, a joystick, a keyboard, a keypad, etc.), a haptic output device, and so forth.

Other components included in the buyer device 118 may include various types of sensors, which may include a GPS device 1418 able to indicate location information, as well as other sensors (not shown) such as an accelerometer, gyroscope, compass, proximity sensor, and the like. Additionally, the buyer device 118 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing instructions executable by the one or more processors, wherein the instructions program the one or more processors to:
receive, at a server computing device associated with a payment processing service and from a merchant device, at least one identifier indicating a current user of the merchant device;
determine, by the server computing device, a merchant language associated with the identifier;
cause, by the server computing device, the merchant device to present, on a display in a merchant-facing orientation and during a current point-of-sale (POS) transaction, information in the merchant language;
receive, at the server computing device and from the merchant device, buyer identifying information for the current POS transaction;
determine, by the server computing device and based at least in part on the buyer identifying information, a buyer profile of a plurality of buyer profiles, the buyer profile corresponding to the current POS transaction;
determine, by the server computing device and based at least in part on the buyer profile, a particular language corresponding to the buyer profile; and
cause, by the server computing device, the merchant device to present, on the display in a buyer-facing orientation and during the current POS transaction, transaction information in the particular language corresponding to the buyer profile.

2. The system recited in claim 1, wherein the instructions further program the one or more processors to:
prior to the receiving the buyer identifying information for the current POS transaction, determine, by the server computing device, the particular language to associate with the buyer profile based at least in part on an express indication that the particular language is a preferred language to be associated with the buyer profile.

3. The system as recited in claim 1, wherein the instructions further program the one or more processors to:
prior to the receiving the buyer identifying information for the current POS transaction, determine, by the server computing device, the particular language to associate with the buyer profile based at least in part on an implicit indication that the particular language is a preferred language to be associated with the buyer profile, wherein the implicit indication is determined based on data associated with POS transactions processed by the payment processing service.

4. The system as recited in claim 3, wherein the instructions further program the one or more processors to:
determine, by the server computing device, the implicit indication of the particular language from a setting of a browser or application that is used to access one or more network locations associated with the buyer profile.

5. A method comprising:
causing, by a service computing device, a merchant device to present, on a first display in a first orientation and in association with a current point-of-sale (POS) transaction, information in a first language, wherein the merchant device comprises one or more displays;
receiving, by a service computing device, from the merchant device, buyer identifying information for the current POS transaction;
determining that the buyer identifying information corresponds to a buyer profile;
determining a second language associated with the buyer profile; and
causing, by the service computing device, the merchant device to present, on a display in a second orientation and in association with the current POS transaction, transaction information in the second language associated with the buyer profile, wherein the display is the first display or a second display.

6. The method as recited in claim 5, further comprising, prior to the receiving the buyer identifying information for the current POS transaction, determining, by the service computing device, the second language to associate with the buyer profile based at least in part on an express indication that the second language is a preferred language to be associated with the buyer profile.

7. The method as recited in claim 6, further comprising receiving the express indication during establishment of an electronic payment account associated with the buyer profile.

8. The method as recited in claim 5, further comprising:
accessing, by the service computing device and based on the buyer identifying information, the buyer profile, wherein the buyer profile stores data associated with POS transactions between the buyer and one or more merchants associated with a payment processing service; and
determining, based at least in part on the data associated with the POS transactions, that the second language is a preferred language to associate with the buyer profile.

9. The method as recited in claim 8, further comprising determining, by the service computing device, that the second language is the preferred language from a setting of a browser or application that is used in association with the POS transactions.

10. The method as recited in claim 9, wherein the determining that the second language is the preferred language from the setting of the browser comprises determining, by the service computing device, the second language from an hypertext transfer protocol accept-language header received when the browser is used to access one or more electronic receipts corresponding to the POS transactions associated with the buyer profile.

11. The method as recited in claim 5, further comprising:
prior to the receiving the buyer identifying information for the current POS transaction, receiving, from the merchant device, at least one identifier indicating a current user of the merchant device;
determining, based at least in part on the identifier, the first language; and
sending, to the merchant device, language information indicating the first language.

12. The method as recited in claim 11, further comprising determining a difference between the first language and the second language, and based at least in part on the determining the difference, sending an indication that the second language is associated with the current POS transaction.

13. The method as recited in claim 5, further comprising:

prior to the receiving the buyer identifying information for the current POS transaction, receiving, from the merchant device, a login associated with a merchant; and determining, based at least in part on the login, the first language.

14. A system comprising:

at least one processor; and a computer-readable media storing instructions executable by the at least one processor, wherein the instructions program the at least one processor to:

receive, at one or more server devices of a payment processing service and from a device, first data associated with a first user;

determine, by the one or more server devices and based at least in part on the first data, a first language associated with the first user;

cause, by the one or more server devices and in association with a transaction, the device to present information in the first language on a display of the device configured in a first user orientation;

receive, at the one or more server devices and from the device, second data associated with a second user;

determine, by the one or more server devices and based at least in part on the second data, a second language associated with the second user; and cause, by the one or more server devices and in association with the transaction, the device to present information in the second language on the display of the device configured in a second user orientation.

15. The system as recited in claim 14, wherein the first data comprises an identifier associated with the first user and the first language is determined based on the identifier.

16. The system as recited in claim 14, wherein the first data comprises a login associated with the first user and the first language associated with the first user is determined based on the login.

17. The system as recited in claim 14, wherein:

the transaction is a current point-of-sale (POS) transaction; and the second data comprises buyer identifying information associated with a buyer of the current POS transaction, the buyer identifying information corresponding to at least one of a payment card, an electronic payment account, an email address, a phone number, or a merchant incentive program identifier.

18. The system as recited in claim 14, wherein a determination by the one or more server devices of the second language is further based on an express indication or an implied indication that the second language is a preferred language to be associated with the second user.

19. The method as recited in claim 5, wherein:

the display is the first display; and the first display is pivotable between the first orientation and the second orientation.

20. The method as recited in claim 5, wherein:

the display is the second display; and the second display is different than the first display.

* * * * *